United States Patent
Inoue

(12) 
(10) Patent No.: US 7,559,761 B2
(45) Date of Patent: Jul. 14, 2009

(54) INJECTION MOLDING MACHINE, INJECTION MOLDING METHOD AND INJECTION MOLD

(75) Inventor: Kazuo Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/629,906

(22) PCT Filed: Nov. 17, 2005

(86) PCT No.: PCT/JP2005/021128

§ 371 (c)(1), (2), (4) Date: Dec. 18, 2006

(87) PCT Pub. No.: WO2006/054647

PCT Pub. Date: May 26, 2006

(65) Prior Publication Data

US 2007/0298137 A1    Dec. 27, 2007

(30) Foreign Application Priority Data

Nov. 18, 2004 (JP) ............................. 2004-334118

(51) Int. Cl.
*B29C 45/38* (2006.01)
*B29C 45/43* (2006.01)

(52) U.S. Cl. .................. 425/553; 425/542; 425/546; 425/554; 425/135; 425/810

(58) Field of Classification Search ................ 425/135, 425/145, 146, 147, 150, 156, 542, 553, 554, 425/556, 557, 559–566, 190, 192 R, 436 R, 425/436 RM, 437, 444, 810, DIG. 60, 405.1, 425/308, 315, 546; 264/40.5, 106, 155, 161
See application file for complete search history.

(56) References Cited

U.S. PATENT DOCUMENTS 4,772,196 A * 9/1988 Asai ......................... 425/155

(Continued)

FOREIGN PATENT DOCUMENTS

JP    59-196212    11/1984

(Continued)

*Primary Examiner*—Philip C Tucker
*Assistant Examiner*—Dimple N Bodawala
(74) *Attorney, Agent, or Firm*—Wenderoth, Lind & Ponack, L.L.P.

(57) ABSTRACT

In forming a plastic mold product having an inner hole, a flash of a degree which is required to be removed in a following step is prevented from occurring. The cutter punch 12 in one of the stationary mold 1 and the movable mold 2, the gas passage 7 in at least one of the stationary mold 1 and the movable mold 2 to communicate with the cavity 54, a valve provided on a gas pipe which communicates with the gas passage 7, and a controller are provided. The cutter punch 12 is adapted to be movable between a normal position for injection of the melted resin and a projected position in which the cutter punch 12 projects into the cavity 54 so that a clearance remains between the cutter punch 12 and its counterpart at the position for forming the optical disk substrate with the inner hole, with the gas coming out of the gas passage being capable of flowing into the clearance. The controller controls the movement of the cutter punch 12 and the opening and closing of the valve in conjunction with the injection of the resin.

13 Claims, 18 Drawing Sheets

U.S. PATENT DOCUMENTS

| | | | | |
|---|---|---|---|---|
| 4,961,884 | A * | 10/1990 | Watanabe et al. | 264/106 |
| 5,161,081 | A | 11/1992 | Machida et al. | |
| 5,464,339 | A * | 11/1995 | Arakawa et al. | 425/186 |
| 5,472,334 | A * | 12/1995 | Takahashi | 425/554 |
| 5,552,098 | A * | 9/1996 | Kudo et al. | 264/106 |
| 5,720,989 | A | 2/1998 | Asai | |
| 5,738,886 | A * | 4/1998 | Asai | 425/556 |
| 5,804,229 | A * | 9/1998 | Asai | 425/556 |
| 5,882,700 | A * | 3/1999 | Asai | 425/556 |
| 5,961,901 | A | 10/1999 | Asai | |
| 5,997,788 | A * | 12/1999 | Ebina | 264/155 |
| 6,174,487 | B1 * | 1/2001 | Asai | 264/335 |
| 6,495,077 | B1 * | 12/2002 | Ishikawa | 264/40.5 |
| 6,830,716 | B2 * | 12/2004 | Daihisa et al. | 264/39 |
| 6,875,378 | B1 * | 4/2005 | Higashida et al. | 264/1.1 |
| 7,008,216 | B2 * | 3/2006 | Fukushima | 425/556 |
| 7,229,275 | B2 * | 6/2007 | Nakano et al. | 425/553 |
| 2002/0000515 | A1 * | 1/2002 | Takayama et al. | 250/231.16 |
| 2003/0147987 | A1 | 8/2003 | Nakano et al. | |
| 2005/0046080 | A1 * | 3/2005 | Daihisa et al. | 264/275 |
| 2006/0051552 | A1 * | 3/2006 | Inada et al. | 428/64.1 |

FOREIGN PATENT DOCUMENTS

| | | | |
|---|---|---|---|
| JP | 62160218 | A * | 7/1987 |
| JP | 2-53282 | | 2/1990 |
| JP | 3-76615 | | 4/1991 |
| JP | 3-79322 | | 4/1991 |
| JP | 4-235006 | | 8/1992 |
| JP | 6-99581 | | 4/1994 |
| JP | 9-193163 | | 7/1997 |
| JP | 9-201839 | | 8/1997 |
| JP | 2002-240101 | | 8/2002 |
| JP | 2002-269848 | | 9/2002 |
| JP | 2005-28731 | | 2/2005 |

* cited by examiner 56a   56

US 7,559,761 B2

INJECTION MOLDING MACHINE, INJECTION MOLDING METHOD AND INJECTION MOLD

TECHNICAL FIELD

This invention relates to an injection molding machine, an injection molding method and an injection mold for molding a plastic product formed with an inner hole.

BACKGROUND ART

In general, optical disk substrates are formed by injection molding. The optical disk substrate is made of thermoplastic resin. FIG. 16 shows an example of a mold used for injection molding. In FIG. 16, numeral 101 denotes a stationary mold, while numeral 102 denotes a movable mold.

A sprue bush 103 serving as an entrance for melted resin is provided at the center of the stationary mold 101. A stamper holder 104 is located between the sprue bush 103 and a stationary mirror surface plate 105. On the stationary mirror surface plate 105, there is located a stamper 106 formed with pits and lands bearing information. The stamper 106 is fixed on the stationary mirror surface plate 105 by means of the stamper holder 104 and a peripheral ring 107. The stationary mirror surface plate 105 is fixed on a stationary base plate 108.

A movable mold 102 is provided with an ejector pin 109, a cutter punch 110, an ejector 111, a movable side fixing bush 112 and a movable mirror surface plate 113 which are arranged in the recited order from the center of the mold. The cutter punch 110 has a function of forming an inner hole in the optical disk substrate by projecting through the optical disk substrate. The ejector 111 has a function of releasing the molded disk from the movable mold 102. The ejector pin 109 has a function of pushing out the sprue portion that has been removed from the optical disk substrate to form the inner hole. The movable side fixing bush 112 has a function of preventing the ejector 111 from directly contacting the movable mirror surface plate 113 and preventing wear of the movable mirror surface plate 113. The movable mirror surface plate 113 is fixed on a movable base plate 114.

A stationary abutting ring 115 is located at the extreme periphery of a stationary mold 101, while a movable abutting ring 116 is located at the extreme periphery of the movable mold 102. The fitting of the movable abutting ring 116 with the stationary abutting ring 115 made the molds 101 and 102 concentric with each other.

FIGS. 17A and 17B show a manner of forming the inner hole. FIG. 17A represents a condition in which melted resin is injected through the sprue hole into the mold with the stationary mold 101 and the movable mold 102 being closed. Next, while the resin is in the melted condition, the cutter punch 110 is caused to fit the sprue bush 103 with the position of the cutter punch relative to the ejector pin 109 being kept unchanged, as shown in FIG. 17B. By this fitting, the inner hole is to be formed in the optical disk substrate.

On the other hand, Patent Document 1 discloses a way to form a disk with an inner hole in which way a member of the stationary mold is slid to project toward a member of the movable mold so that the sprue bush fits the ejector.

Further, Patent Document 2 discloses making the cutter punch of the movable mold concave, and making the sprue bush convex so that the cutter punch fits the sprue bush.

Alternatively, it has been also proposed to form the disk with the inner hole without the fitting of members. Patent Document 3, for example, discloses molding an optical disk substrate with the sprue connected by a thin film connecting portion. After the resin has been solidified, the connecting portion is cut by projecting the ejector sleeve upon releasing of the optical disk substrate. Thus, the sprue is removed from the optical disk substrate.

According to the ways shown in Patent Documents 1 and 2 in which a couple of members fit each other while the resin is in melted condition, a flash would be caused at the fitting clearance between the couple of members by the melted resin thrusting into the clearance. In this case, depending on which of the male member and female member for forming the hole is provided in which of the stationary mold and the movable mold, the flash is formed on either end of the inner hole as shown in FIG. 18A or FIG. 18B. In the case of Patent Document 3, on the other hand, the flash is caused in the midway of the inner hole as shown in FIG. 18C.

As a way to remove the flash, a process of cutting it by a cutter is disclosed in Patent Document 4, another way of melting it down by a burner is disclosed in Patent Document 5, and still another way of decomposing it by ultraviolet light is disclosed in Patent Document 6.

Patent Document 7 also discloses a technology relating to the flash although it is not for forming an optical disk substrate. Patent Document 7 discloses a method for producing a plastic molding product wherein a high pressure of air introduced into the cavity through a mold (e.g., upper mold) which forms the back surface of the product to depress the resin mold product against the lower mold, thereby preventing generation of sink marks on its outer surface. Patent Document 7 teaches to define the dimension of the clearance for introducing the high pressure of air in order to prevent the melted resin from thrusting into the clearance to thereby preventing generation of the flash.

[Patent Document 1] Japanese Patent No. 1944425
[Patent Document 2] Japanese patent application laid open No. 2002-240101
[Patent Document 3] Japanese Patent No. 2071462
[Patent Document 4] Japanese patent application laid open No. Hei4-235006
[Patent Document 5] Japanese patent application laid open No. Sho59-196212
[Patent Document 6] Japanese patent application laid open No. Hei6-99581
[Patent Document 7] Japanese patent application laid open No. 2005-28731

Even if a step of removing flash such as shown in any of Patent Documents 4, 5 and 6 is provided, a problem still remains in that a flash is incompletely removed to cause a remaining flash leaves from the disk during the delivery thereof to stick to the surface of the disk as undesirable dirt. In the case that the plastic mold product is an optical disk substrate, especially, the undesirable dirt would deteriorate the quality of information thereon. Further, the flash may be sandwiched in between optical disk substrates when they are adhered to each other, resulting in inaccuracy in the thickness of the completed optical disk product. Further, the occurrence of flash varies along the circumference of the inner hole. Therefore, when an optical disk produced with the optical disk substrates suffered from the flash in the vicinity of the inner hole is set in a disk drive, a remarkable eccentricity occurs.

The necessity of removing the flash increases the number of steps for production. Further, an inaccurate removal of the flash would possibly influence on the diameter of the inner hole.

It may be possible to narrow the clearance between the components of the mold that cause the flash at issue, for preventing the resin from thrusting into the clearance. This approach, however, poses another problem in that it is difficult to carry out maintenance of the mold by deassempling and reassembling the mold because the components of the mold are fitted with each other tightly. Further, if a component of the mold causing the flash is of a type sliding on another component, wear of components of the mold would be remarkably increased.

SUMMARY OF THE INVENTION

This invention was made in view of the above-mentioned problems. An object of this invention is to prevent the flash from occurring in forming an inner hole in a plastic mold product in such a manner that the occurrence of the flash is prevented to such a degree that there is no necessity of removing it if any in a following step.

Accordingly, this invention is directed to an injection molding machine for forming a plastic mold product having an inner through hole by injecting a melted resin into a cavity defined by a first mold and a second mold. An injection molding machine according to this invention comprising: a movable portion provided in one of the first and second molds; a gas passage provided in at least one of the first and second molds to communicate with the cavity; a valve provided in a gas pipe communicating with the gas passage; and a controller, wherein the movable portion is adapted to be movable between a normal position at which injection of the melted resin is carried out and a projected position projecting into the cavity so that a clearance remains between the movable portion and its counterpart mold at the position where the inner through hole is to be formed, with the gas coming out of the gas passage being capable of flowing into the clearance, and wherein the controller controls the movement of the movable portion and the opening and closing of the valve in conjunction with the injection of the resin.

Further, this invention is directed to an injection molding method of forming a plastic mold product having an inner through hole by injecting a melted resin into a cavity defined by a first mold and a second mold. This invention provides an injection molding method characterized in that: providing a gas passage in at least one of the first and second molds to communicate with the cavity and providing a movable portion in one of the first and second molds; the movable portion is adapted to be movable between a normal position for injection of the melted resin and a projected position projecting into the cavity so that a clearance remains between the movable portion and its counterpart mold at a position where the inner through hole is to be formed, with the gas coming out of the gas passage being capable of flowing into the clearance; and moving the movable portion to the projected position after the injection of the melted resin into the cavity so that the gas flows into the clearance.

This invention is still further directed to a mold having a first mold and a second mold to define a cavity for forming a plastic mold product having an inner through hole. This invention provides a mold comprising: a movable portion provided in one of the first and second molds; and a gas passage provided in at least one of the first and second molds to communicate with the cavity, wherein the movable portion is adapted to be movable between a normal position for injection of the melted resin and a projected position projecting into the cavity so that a clearance remains between the movable portion and its counterpart mold at the position where the inner through hole is to be formed, with a gas coming out of the gas passage being capable of flowing into the clearance.

According to this invention, the movable portion is moved to the projected position to form, in cooperation with the mating mold, a clearance at the position corresponding to the periphery of the inner through hole of the plastic mold product. This means that the gas flowing out of the gas passage flows into the clearance to push out the melted resin therein. Thus, the melted resin existing in the clearance moves toward the inner through hole not to form the flash at the inner through hole. This invention, accordingly, forms a plastic product having an inner hole without a flash even if any step of removing the flash is not provided. Therefore, it is possible to prevent a flash from sticking to the product as undesirable dirt. Further, as the invention does not require a step of removing a flash after it is formed, it can provide plastic molded products with stabilized quality.

DETAILED DESCRIPTION OF PREFERRED EMBODIMENTS

The following description explains the best mode of embodying this invention in detail with reference to the drawings.

Embodiment 1

Figure 1:
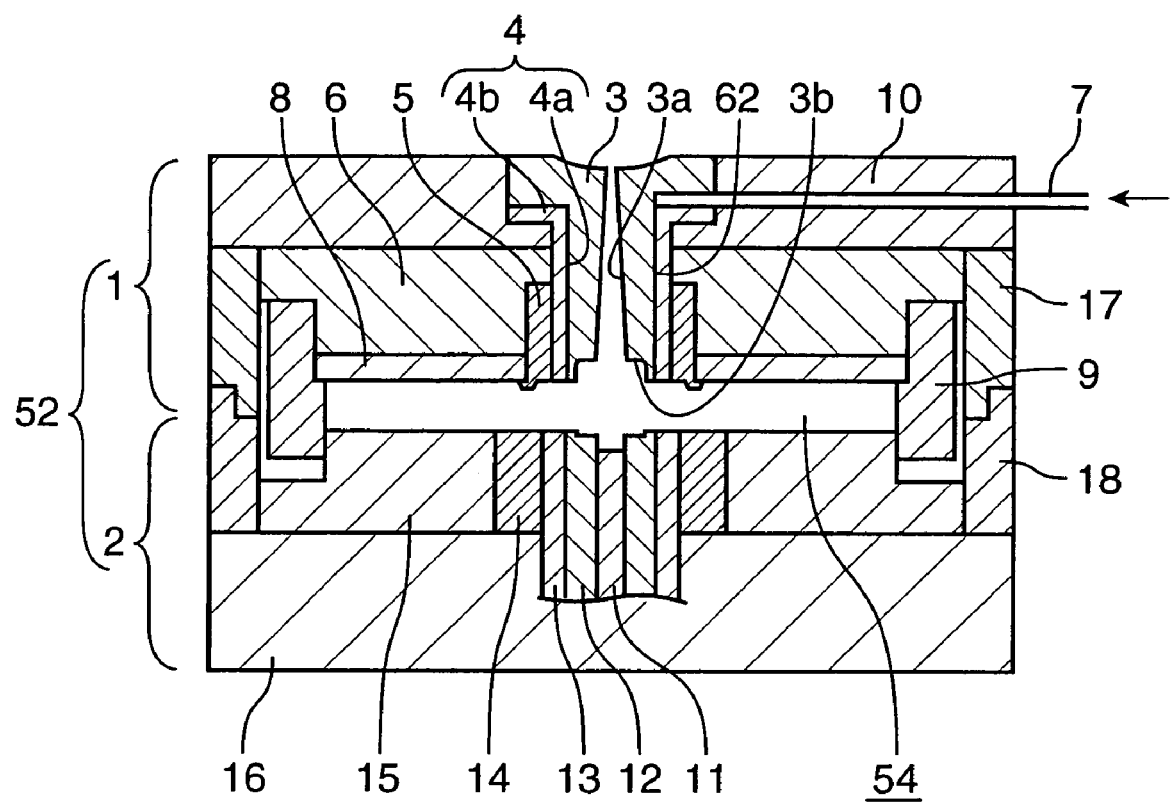
FIG. 1 is a cross sectional view of the injection mold relating to Embodiment 1 of this invention.
Figure 2:
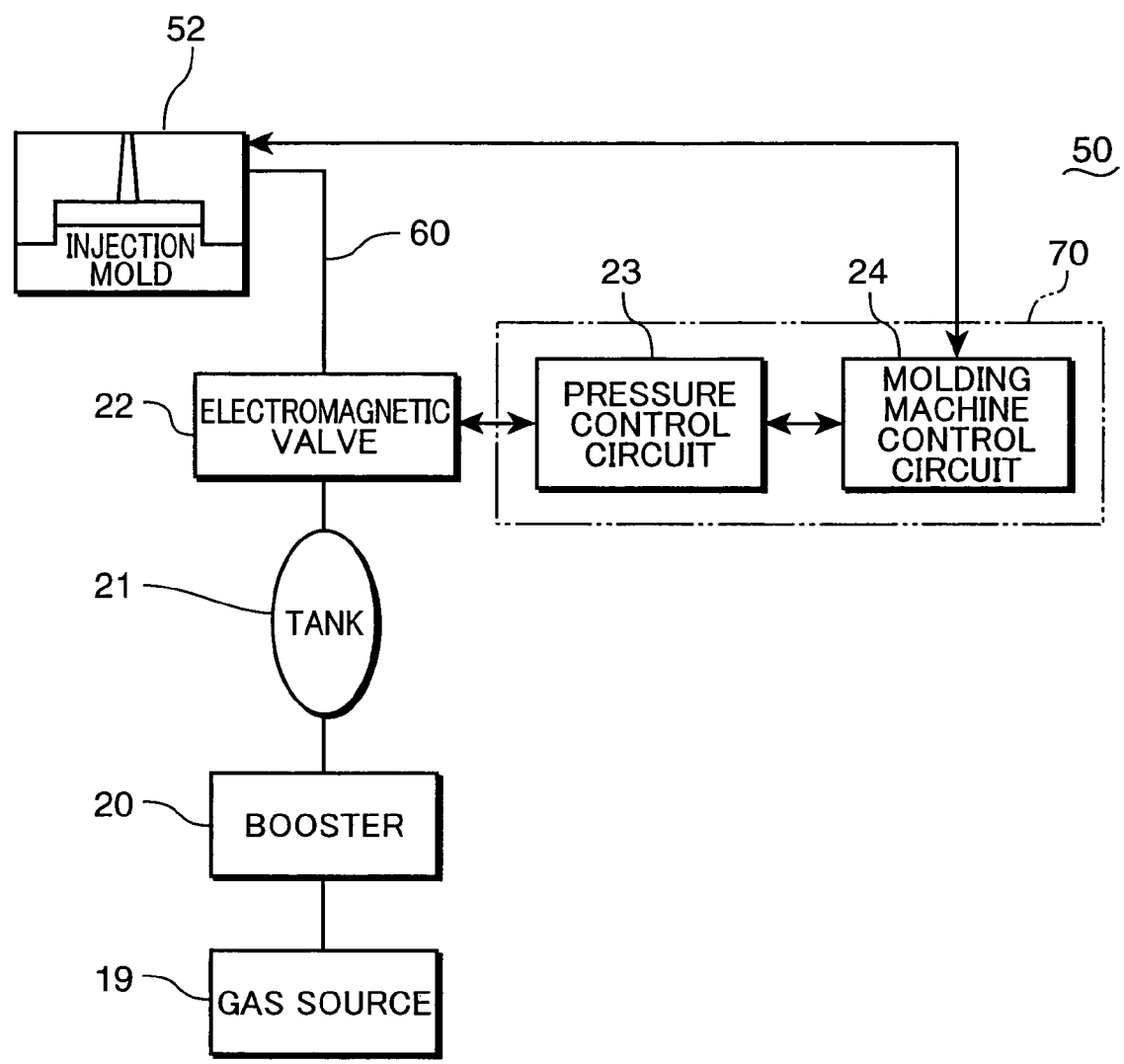
FIG. 2 is a diagram to show the configuration of injection molding machine according to Embodiment 1 of this invention.

FIG. 1 is a cross sectional schematic view of a principal part of an injection mold set to be provided in an embodiment of the injection molding machine according to this invention. FIG. 2 is a schematic diagram to show the configuration of an injection molding machine 50. The injection molding machine 50 is for forming an optical disk substrate 56, which is a disk-shaped plastic mold product formed with the inner hole 56a at the center thereof.

As shown in FIGS. 1 and 2, the injection molding machine 50 includes an injection mold 52 for forming optical disk substrate 56 which is formed with an inner hole 56a. The injection mold 52 includes a stationary mold 1 as an example of the first mold and a movable mold 2 as an example of the second mold, with a cavity 54 of a disk shape being defined between the pair of the molds 1 and 2.

The stationary mold 1 is provided with a stationary base plate 10, a stationary mirror surface plate 6, a sprue bush 3, a stationary side fixing bush 4, a stamper holder 5, a peripheral ring 9 and a stamper 8. The sprue bush 3 is located at the center of the stationary mold 1. The sprue bush 3 is provided with a sprue hole 3a, which serves as an entrance for the melted resin. The sprue hole 3a is shaped so that its cross-sectional area increases in the direction toward the cavity 54. The inner surface of the end of the sprue bush 3 is formed with a concave portion 3b in such an area as to include the downstream edge of the sprue hole 3a. The sprue bush 3 is formed to have its outer diameter that is almost equal to the inside diameter of the inner hole of the optical disk substrate 56. A melted resin supplier not shown supplies the melted resin into the sprue hole 3a.

The stationary side fixing bush 4, the stamper holder 5, and the stationary mirror surface plate 6, which are arranged in this recited order, are provided on the outer side of the sprue bush 3. The stationary mirror surface plate 6 is fixed on the stationary base plate 10. The central portions of the stationary base plate 10 and the stationary mirror surface plate 6 are formed with a through hole communicating with the cavity 54.

The stamper 8 having information in the form of pits and lands is located on the inside surface of the stationary mirror surface plate 6. The stamper 8 is fixed on the stationary mirror surface plate 6 by means of the stamper holder 5 arranged at the central portion and the peripheral ring 9 arranged at outer periphery of the stationary mold.

The stationary side fixing bush 4 is provided with a cylinder-shaped cylindrical portion 4a and a flange portion 4b formed at the proximal portion of the cylindrical portion 4a. The cylindrical portion 4a of the stationary side fixing bush 4 fits into the through hole of the stationary base plate 10 and the stationary mirror surface plate 6. The top end (i.e., inside end) of the cylindrical portion 4a aligns with the end (i.e., inside end) of the stamper holder 5. The sprue bush 3 fits into the stationary side fixing bush 4 to be thereby held by the stationary side fixing bush 4. As the sprue bush 3 is removable from the stationary side fixing bush 4, only the sprue bush 3 can be interchanged.

The stationary base plate 10 is provided with a gas passage 7, the outer end of which projects from the side wall of stationary base plate 10 for a connection with the outer gas pipe 60 (shown in FIG. 2). The gas passage 7 extends to the central portion of the stationary base plate 10 to communicate with a gap 62 formed between the sprue bush 3 and the cylindrical portion 4a of the stationary side fixing bush 4. A high pressure gas from the gas passage 7 can flow into the gap 62. The gap 62 is formed to extend longitudinally along the cylindrical portion 4a of the stationary side fixing bush 4 for the entire length of the cylindrical portion 4a for the gas passage 7 to communicate with the cavity 54 through the gap 62.

On the other hand, the movable mold 2 is provided with an ejector pin 11, a cutter punch 12 as an example of the movable portion, an ejector 13, a movable side fixing bush 14, a movable mirror surface plate 15 and a movable base plate 16. The cutter punch 12, the ejector 13, the movable side fixing bush 14, and the movable mirror surface plate 15 are arranged in the recited order from the center of the movable mold 2.

The ejector pin 11 and the cutter punch 12 are located at a position so as to face the sprue bush 3. The outer diameter of sprue bush 3 is approximately equal to that of the cutter punch 12. This means that the gap 62 between the sprue bush 3 and the stationary side fixing bush 4 is located in a position so as to oppose the peripheral surface of the cutter punch 12.

The cutter punch 12 is movable between a normal position where the melted resin is injected into the cavity 54 and a projected position where the cutter punch 12 projects from the normal position into the cavity 54 toward the sprue bush 3.

In the normal position, the inside end surface of the cutter punch 12 flushes with the inside surfaces of the movable side fixing bush 14 and the movable mirror surface plate 15 in the Embodiment 1 for example. Therefore, the cutter punch 12 at the normal position and the sprue bush 3 are arranged to form a space therebetween corresponding to the thickness of the optical disk substrate 56.

The cutter punch 12 is formed with a concave portion 12a at its inside end with its peripheral portion being left. The cutter punch 12 is formed with a hole for receiving the ejector pin 11, which retracts into the hole to a position lower than the level of the concave portion 12a.

The cutter punch 12 is constructed as a slider slidable relative to the ejector 13. The cutter punch 12 has a function of forming the inner hole 56a in optical disk substrate 56 by projecting from the normal position to the projected position.

In the situation where the cutter punch 12 projects to the projected position, the concave portion 12a of the cutter punch 12 and the concave portion 3b of the sprue bush 3 face each other to form a space therebetween. Within this space, a sprue portion 64 separated from optical disk substrate 56 to form the inner hole 56a is contained. (See FIG. 4)

Further, in the situation where the cutter punch 12 projects to the projected position, a clearance 66 (e.g., gas flowing out clearance) of a predetermined dimension is formed between the inside end of the cutter punch 12 surrounding the concave portion 12a and the inside end of the sprue bush 3 surrounding the concave portion 3b. The clearance 66 is formed at a position leading to the surface defining the inner hole 56a of the optical disk substrate 56 in the cavity 54. In Embodiment 1, since the inside end surface of the sprue bush 3 approximately flushes with the inside surface of the stamper 8, the clearance 66 is located at the end of the inner hole 56a of the optical disk substrate 56 in the direction of its thickness.

At just the timing when the cutter punch 12 projects to the projected position, the melted resin exists in the clearance 66. In other words, melted resin in the cavity 54 is in such a situation that the sprue portion 64 within the concave portions 12a and 3b connects with optical disk substrate 56 outside the cutter punch 12 by a thin layer of resin within the clearance 66. The melted resin, accordingly, would cause a circular flash at the inner hole 56a of optical disk substrate 56 if it solidifies in this situation. However, the melted resin within the clearance 66 is actually removed by a high pressure gas flowing into the clearance 66 before the solidification of the melted resin. This will be described later in detail.

The ejector pin 11 moves integrally with the cutter punch 12 while the cutter punch 12 projects from the normal position to the projected position. The ejector pin 11 is capable of sliding relative to the cutter punch 12 at its projected position. The ejector pin 11 projecting from the cutter punch 12 pushes the sprue portion 64 which has been separated from optical disk substrate 56 to form the inner hole 56a. This corresponds to the function of releasing the sprue portion 64 from the movable mold 2.

The ejector 13 is arranged with its inside end approximately flushing with the movable mirror surface plate 15, and also is capable of sliding within the movable side fixing bush 14. The ejector 13 projecting from the movable side fixing bush 14 functions to release the optical disk substrate 56 formed in the cavity 54 from the movable mold 2. The movable side fixing bush 14 prevents the ejector 13 from directly contacting with the movable mirror surface plate 15 and causing the wear of the movable mirror surface plate 15. The movable mirror surface plate 15 is fixed on the movable base plate 16.

A stationary abutting ring 17 is located at the extreme periphery of the stationary mold 1, while a movable abutting ring 18 is located at the extreme periphery of the movable mold 2. The fitting of the stationary abutting ring 17 with the movable abutting ring 18 aligns the centers of the stationary mold 1 and the movable mold 2.

FIG. 2 is a schematic diagram to show the entire system of the injection molding machine 50 according to this embodiment. As shown in this Figure, the injection molding machine 50 includes a controller 70, a tank 21, a pressurizer or booster 20, and an electromagnetic valve 22 as an example of a valve provided for a gas pipe 60 communicating with the injection mold 52.

The booster 20 is connected to a gas source 19 by way of a pipe so that the gas is supplied from the gas source 19. A gas of a low pressure supplied from the gas source 19 is compressed by the booster 20 to a predetermined pressure and is stored in the tank 21.

The gas pipe 60 is provided with the electromagnetic valve 22 between the tank 21 and gas passage. The high pressure gas in the tank 21 flows into the gas passage 7 when the electromagnetic valve 22 is open.

The controller 70 includes a pressure control circuit 23 and a molding machine control circuit 24. The molding machine control circuit 24 controls and drives the injection mold 52, while the pressure control circuit 23 controls the opening and closing of the electromagnetic valve 22 in accordance with a signal from the molding machine control circuit 24. In more detail, the pressure control circuit 23 calculates a timing of starting of the high pressure gas supply and duration of the gas supply in accordance with a signal from the molding machine control circuit 24, and sends a signal to the electromagnetic valve 22 for controlling the flow of the high pressure gas.

Figure 4:
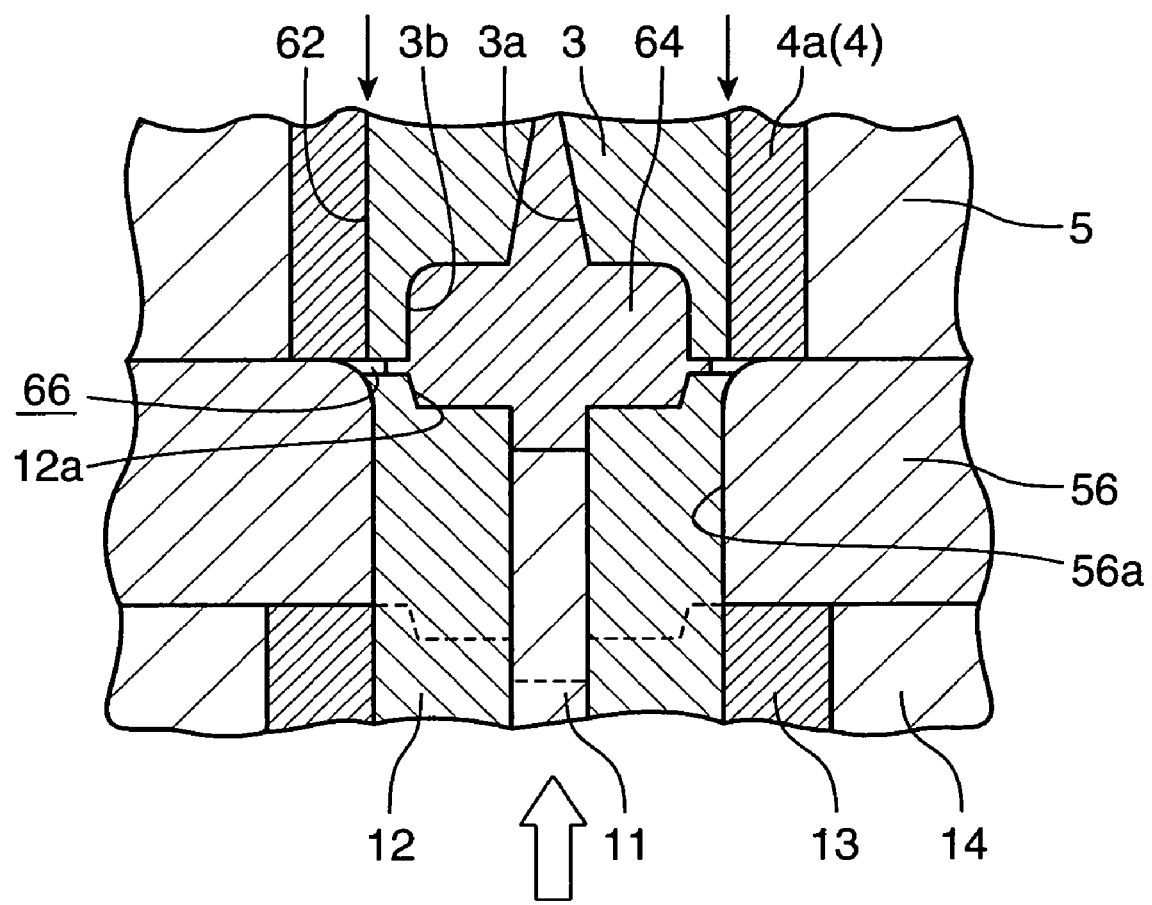
FIG. 4 is a partially enlarged cross sectional view of the injection mold above.

Next, a way of forming, within the mold 52, the optical disk substrate 56 having the inner hole 56a according to this embodiment is explained with reference to FIG. 4, which shows in more detail a part of the mold 52 of FIG. 1. The cutter punch 12 is in its normal position (shown by broken line in FIG. 4) when the injection mold 52 is closed. Under this situation, melted resin is injected into the cavity 54 through the sprue hole 3a. The resin in the cavity 54 remains melted for a time period following its injection. Within the time period mentioned above, the cutter punch 12 is advanced in the direction shown by the white arrow into a position just before the position where the cutter punch 12 comes into contact with the sprue bush 3 as shown in FIG. 4. By means of this, the inner hole 56a is formed in optical disk substrate 56. In this step, the ejector pin 11 is moved with the movement of the cutter punch 12, with the position relative to the cutter punch 12 being kept. This is for shortening the stroke for the ejector pin 11 to push out the sprue portion 64 that has been separated from optical disk substrate 56 after the solidification of the resin. This shortened stroke is advantageous in preventing the resin within the hole for the pin from fracturing.

The cutter punch 12 is advanced in the predetermined manner to the projected position indicated by solid line in FIG. 4, in which the slight clearance 66 for allowing gas flow is formed between the inside end of the sprue bush 3 and the inside end of the cutter punch 12. The inside end of the sprue bush 3 around the concave portion 3b and the inside end of the cutter punch 12 around the concave portion 12a are each flat in a ring shape. The clearance between the sprue bush 3 and the cutter punch 12 is preferably less than 0.1 mm, and more preferably greater than 10 µm and less than 50 µm.

Next, when the electromagnetic valve 22 is opened, the high pressure gas from the tank 21 coming through the gas pipe 60 and the gas passage 7 flows into the circular gap 62 between the sprue bush 3 and the stationary side fixing bush 4. As shown in the downwardly directed allows in FIG. 4, the high pressure gas flows through the gap 62 toward the cavity 54 and in turn into the clearance 66 from the gap 62 to remove melted resin existing in the vicinity of the exit of the gap 62. Accordingly, the melted resin is forced to move out of the gas flowing clearance 66 to the disk side and the sprue portion side. Thus, no flash is formed at the inner hole 56a of the optical disk substrate 56 upon the solidification of the resin.

The volume of the melted resin which is caused to move is influenced by the resin pressure and the gas pressure. In other words, the movement of resin is to cease when the resin pressure and the gas pressure balance each other. FIG. 4 shows a situation in which the optical disk substrate 56 is completely separated from the sprue portion 64 by the high pressure gas flowing into the cavity 54.

Under the condition that resin forming the sprue portion 64 is completely separated from the resin forming the optical disk substrate 56 with the inner hole 56a formed, the resin is solidified. After the solidification, the optical disk substrate 56 is released from the mold 52. In other words, the movable mold 2 is moved apart from the stationary mold 1 with air flowing out of a space between the stationary side fixing bush 4 and the stamper holder 5 as well as air flowing out of a space between the ejector 13 and the movable side fixing bush 14. At the same time, the ejector pin 11 and the ejector 13 are projected. Thus, the sprue portion 64 and the optical disk substrate 56 are demolded and taken out, respectively.

In the method disclosed by Patent Document 7 mentioned in the Background Art, sink marks are prevented from being formed on the product by means of depressing the product onto the lower mold with a high pressure of air. Further, the method teaches to define the dimension of the clearance of introducing the high pressure of air for the purpose of preventing the melted resin from thrusting into the clearance to thereby preventing the flash from being caused. This method is, however, to prevent a flash from being caused due to a clearance through which a high pressure of air is introduced to prevent sink marks on the product. The present invention is, on the other hand, to prevent a flash from being caused due to the formation of the inner hole in the product. Thus, both differ from each other.

Figure 5:
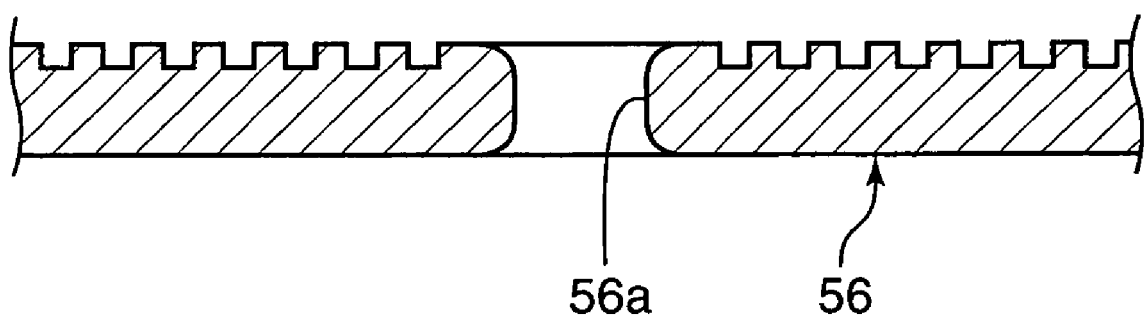
FIG. 5 is a cross sectional view of the optical disk substrate formed by the injection molding machine above.

An explanation will be made about a molding test made on the polycarbonate plastic. The test is made in a condition of producing an optical disk substrate for a Blue-ray Disc of 120 mm in outer diameter and 1.2 mm in thickness. According to this test, it is confirmed that the shape in the vicinity of the inner hole 56a of the molding substrate 56 as shown in FIG. 5 does not include any flash at all at the end or midway of the inner hole 56a by means of suitably conditioning of the high pressure gas flowing into the mold 52.

The optical disk is standardized with respect to the outer diameter and the diameter of the inner hole. And, by means of conditioning the volume of the high pressure gas to flow into the gas flowing clearance 66, the occurrence of a flash or sink mark is minimized at the inner hole 56a of the optical disk substrate 56. In other words, the volume of the high pressure gas to flow into the mold 52 is sufficient if it can slightly push back the melted resin forming the inside surface of the inner hole 56a. The necessary gas volume is accordingly slight. Also the pressure of the high pressure gas is sufficient if it is slightly higher than that of melted resin (e.g., resin pressure). A gas pressure or gas volume which is too large would result in an excessive pushing of the melted resin for forming the inner hole 56a to cause a pocket or a bubble in the vicinity of the inner hole 56a. On the other hand, an insufficient gas pressure or gas volume would result in an insufficient pushing back of the melted resin existing in the clearance 66 before its solidification to cause a flash at the inner hole 56a. Further, in the case of a gas pressure which is too high, a variation in gas volume coming out of the gap 62 in circumferential directions is apt to occur. In other words, in a case that the dimension of the gap 62 varies along the circumferential direction, a greater volume of gas would come out of the gap 62 at a portion of a greater gap if the gas pressure is too high, which means that the volume of coming-out gas varies greatly along the circumferential direction. Still further in the case of a gas pressure which is too high, variation in gas volume in every shot would occur even if the gas supplying time period is kept constant throughout all the shots.

In view of the above, the optimization of gas pressure and gas volume is essential to prevent the resin from causing flash or sink marks. As the result of an investigation, it is found preferable to condition the gas flow into the clearance 66 with a pressure higher than that of melted resin (e.g., resin pressure) by 2% to 15%, and more preferably by 5% to 10%. And, it is found preferable to supply the gas under the above condition for a period greater than 0.05 second and less than 0.1 second.

The resin pressure in the cavity 54 is equal to the pressure on the resin in the cavity 54 caused by the clamping force of the molding machine 50 in the case of the injection molding machine 50 having no core pushing mechanism as shown in FIG. 1. In the case of a molding machine with the core pushing mechanism, on the other hand, the resin pressure is equal to the pressure on the resin caused by the clamping force of the molding machine with no compression force applied yet to the mold. And, the resin pressure is equal to the pressure on the resin caused by the compression force with the compression force having been applied to the mold. In other words, the resin pressure is equal to the clamping force or compression force divided by the area of the circular plane of the plastic mold product serving as optical disk substrate 56.

The following is an example of calculation of the resin pressure for molding optical disk substrate 56. Namely, in the case of optical disk substrate 56 of 120 mm in its outer diameter and 15 mm in its inside diameter, the area (of one side) of the melted resin to which the clamping force or the compression force is applied is:

$$(6\times 6 - 0.75\times 0.75)\times \pi = 111.33 [cm^2]$$

So, the resin pressure, where the clamping force is 98 kN, is:

$$98[kN] / (111.33\times 10^{-4} [m^2]) = 8.8\times 10^3 [kN/m^2]$$
$$= 8.8 [MPa]$$

For stabilizing the shape of the inner hole 56a of optical disk substrate 56 in production, it is preferable that the pressure of the high pressure gas to be introduced into the cavity 54 is prevented from varying depending on every shot. The variation in the pressure of the high pressure gas is kept preferably within ±5% of the set value (e.g., target value). For this purpose, it is preferable to provide the injection molding machine 50 with a gas pressure controller to keep the gas pressure within the predetermined range.

Figure 3:
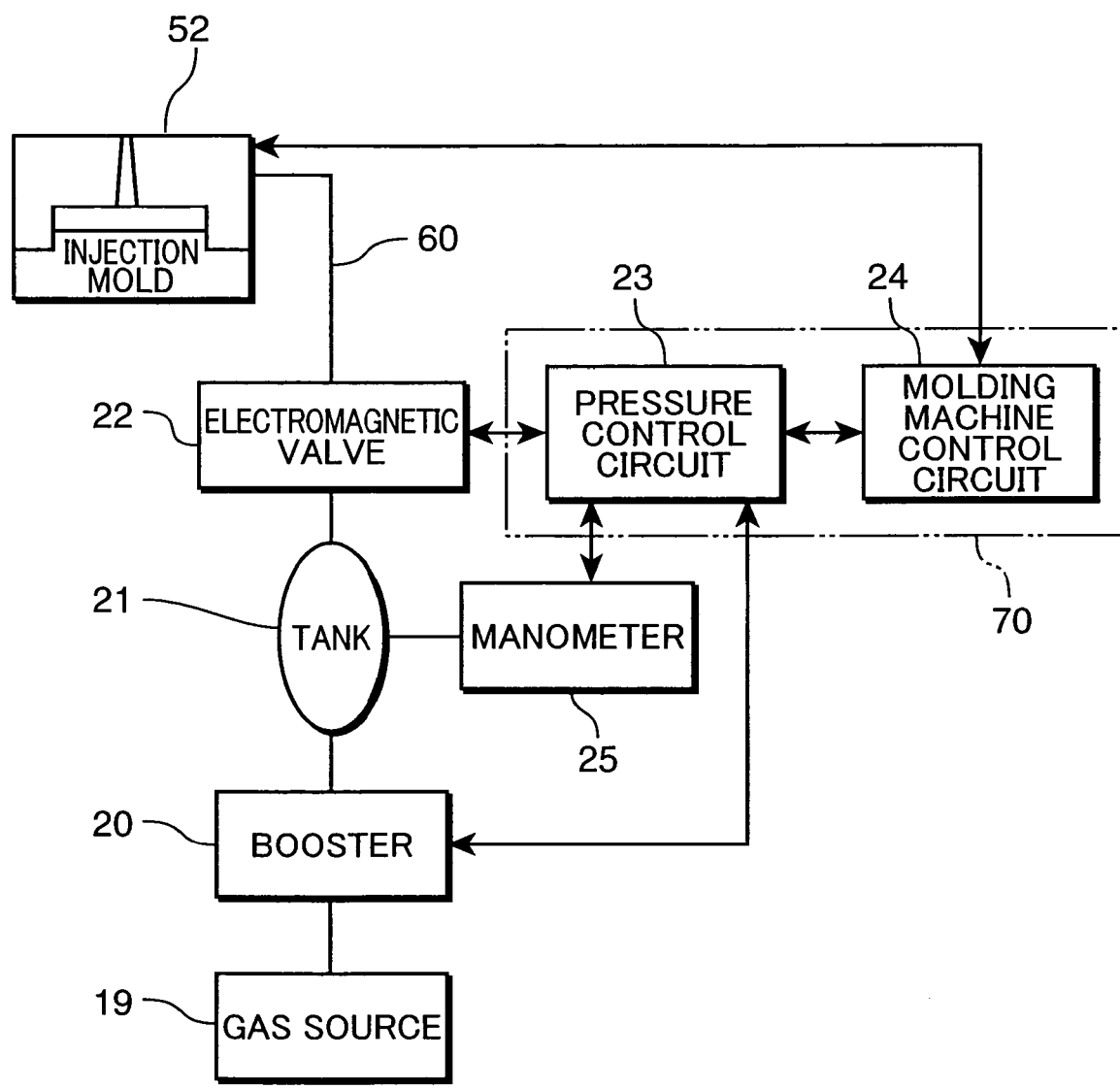
FIG. 3 is a diagram similar to FIG. 2 to show another configuration for the injection molding machine according to Embodiment 1 of this invention.

As shown in FIG. 3, for example, the gas pressure controller includes a manometer 25 as an example of the pressure detector for measuring the pressure in the tank 21 and the pressure control circuit 23 for controlling the pressure in the tank in accordance with the measurement result of the manometer 25. With an input signal to the pressure control circuit 23 in accordance with the measurement result of the manometer 25, the pressure control circuit 23 is designed to output a signal to drive the booster 20 when the measured pressure is less than a predetermined value. Thus, the pressure in the tank 21 can be controlled within a predetermined range by means of the driving of the booster 20. The predetermined value is a value less than the set value by 5% or the less.

It is preferable that the distance from the electromagnetic valve 22 to the clearance 66 (at the end of the gap 62 between the sprue bush 3 and the stationary side fixing bush 4) from which the high pressure gas flows out is set to less than 1 m and more preferably less than 0.5 m in the case of the gas pipe 60 with its caliber of 6 mm. This improves the speed of response of the high pressure gas. If the distance is too large, on the contrary, the volume of high pressure gas existing within the gas pipe 60 would be excessive, resulting in an increased movement of resin from the clearance 66 from which the high pressure gas flows out. This means that the resin is pushed too much by the high pressure gas to possibly cause an undesirable pocket at the inner hole 56a. The inner volume of the pipe is 28.3 cm³ in the case of the gas pipe 60 with its caliber of 6 mm and its length of 1 m.

As an exemplary test, optical disk substrate 56 with outer diameter of 120 mm, inside diameter 15 mm and thickness of 1.1 mm is molded with polycarbonate under the condition that air is used as the high pressure gas and the distance from the electromagnetic valve 22 to the clearance 66 where the high pressure gas flows out is 0.5 m. Other conditions are that the period of time for injecting the melted resin is 0.1 second and that the clamping force of 196 kN is applied for compression for a period of 0.1 second after 0.05 second past the filling of the cavity 54 with the melted resin, the clamping force being kept at 98 kN afterward. The cutter punch 12 is advanced to the projected position after 0.2 second past the filling with the melted resin, and the compressed air with a pressure of 9.5 MPa as the high pressure gas is applied for a period of 0.3 second after the complete stop of the cutter punch 12. The clearance between the sprue bush 3 and the cutter punch 12 is 20 μm in this case. In the exemplary test made under the above-mentioned conditions, there is formed, at the end on the high pressure gas outflow side of the inner hole 56a of the optical disk substrate 56, a round edge with its radius less than 0.1 mm without no flash nor sink mark.

In this embodiment, as has been apparent from the above description, the high pressure gas out of the gas passage 7 of the stationary mold 1 flows into the clearance 66 between the sprue bush 3 and the cutter punch 12 to push out the melted resin in the clearance 66. Thus, the melted resin existing in the clearance 66 moves toward the inner hole 56a not to form a flash at the inner hole 56a of the optical disk substrate 56. Accordingly, a flash which must be removed after molding of optical disk substrate 56, is prevented from occurring. This feature of being free from any requirement of accurately removing flash is advantageous to increase the accuracy of thickness in stacking the optical disk substrates 56. Further, it is possible to prevent a part of the flash from separating from the optical disk substrate 56 and sticking thereon as undesirable dirt during the production process, which increases the reliability of an optical disk product made of these molding substrates. Still further, the improvement against eccentricity of the inner hole 56a is advantageous for a stable tracking control when the optical disk is set in a disk drive.

The features of Embodiment 1 are summarized in the followings.

(1) According to this embodiment of injection molding machine, the controller opens the valve for a predetermined period of time. Therefore, the cavity is supplied with a predetermined volume of gas through the gas pipe to effectively control the volume of resin to be moved.

(2) This embodiment of injection molding machine is for forming an optical disk substrate. This embodiment is free from accuracy due to removal of a flash, and is improved in the accuracy of thickness when the optical disk substrates 56 are adhered to each other. Further, it can be avoided that a part of the flash removes from the optical disk substrate 56 and sticks thereon as undesirable dirt during production process, thereby increasing the reliability of optical disk product made of this molding disks. Still further, as the eccentricity of the inner hole 56a is made minimum, tracking control can be stable when the optical disk is set in a disk drive.

(3) According to this embodiment of the injection molding machine, the controller opens the valve for a predetermined period of time. Therefore, the cavity is supplied with a predetermined volume of gas through the gas pipe to effectively control the volume of resin to be moved.

(4) According to this embodiment of the injection molding machine, the controller opens the valve for a period greater than 0.05 second and less than 1 second. Therefore, sink mark or flash is prevented from appearing on the plastic mold product.

(5) According to this embodiment of the injection molding machine, the gas pipe is provided with a tank in the upstream of the valve, the inside pressure of the tank being set higher than the pressure of the melted resin by 2% or more and 15% or lower. By this setting, the gas out of the gas passage can push the melted resin in the cavity to move the resin.

(6) According to this embodiment of the injection molding machine, the length of the gas pipe downstream of the tank is less than 1 m. This improves the speed of response of the gas.

(7) According to this embodiment of the injection molding machine, the clearance is set not less than 10 μm and not greater than 50 μm. By this setting, the gas flowing into the clearance can effectively move the melted resin out of the clearance.

(8) According to this embodiment of the injection molding machine, the clearance is defined at a position in the vicinity of an inner surface of the inner through hole in the plastic mold product or a position closer to the center of the inner through hole. By this, the gas flowing into the clearance can effectively push the melted resin forming the surface of the circumferential wall defining the inner hole.

(9) According to this embodiment of the injection molding machine, the clearance is defined at the end of the inner through hole with respect to the direction of the puncturing. Accordingly, the gas flowing into the clearance can push the melted resin forming the end of the inner hole. The melted resin at the end of the inner hole is pushed by the gas to retract. Thus, even in a case that a parting line of the mold is located at the end of the inner hole, a flash due to the parting line is not likely to be generated.

(10) According to this embodiment of the injection molding machine, the gas passage is so constructed to communicate with the clearance through a gap between a sprue bush and a stationary bush which holds the sprue bush. Accordingly, the gas passage can substantially communicate with the cavity by way of the gap even if a gas passage is not formed to connect the cavity by itself.

(11) According to this embodiment of the injection molding machine, the controller maintains the pressure of the gas within a predetermined range when the valve is opened. This stabilizes the gas pressure flowing into the clearance every time when the valve is opened, thereby stabilizing the amount of the melted resin to be pushed and moved by the gas.

(12) According to this embodiment of the injection molding machine, the controller controls the gas pressure within a range of 5% with respect to the target pressure. This surely restrains within a tolerable range a possible occurrence of a pocket or the like at the inner hole due to the movement of the melted resin.

(13) This embodiment of the injection molding machine is provided with a tank in the upstream of the valve of the gas pipe, a pressure detector for detecting the pressure inside the tank and a pressurizer for increasing the pressure inside the tank, wherein the controller activates the pressurizer in accordance with the pressure detected by the pressure detector. Accordingly, the pressure in the tank upon opening the valve is surely kept within a predetermined range.

(14) According to this embodiment of the injection molding method, the gas is air or nitrogen.

(15) According to this embodiment of the injection molding method, the gas is controlled to flow for a predetermined period of time. Thus, the gas flows into the cavity through the gas passage with a predetermined volume to effectively control the volume of the resin to be moved.

(16) According to this embodiment of the injection molding method, gas is controlled to flow with a pressure higher than the pressure of the melted resin by 2% or more and 15% or less. Thus, the gas flowing out of the gas passage can push the melted resin in the cavity to cause the movement of the resin.

(17) According to this embodiment of the injection molding method, the clearance is set to not less than 10 μm and not greater than 50 μm. Thus, the gas flowing into the clearance can move the melted resin out of this clearance.

(18) This embodiment of the injection molding method is for forming optical disk substrates.

The injection mold comprises a plurality of parts resulting in the formation of a parting line between the parts, with a clearance generally existing along the parting line. Even in an injection molding with such a mold, a flash would be scarcely caused in the case of an optical disk substrate with a low density of information such as the compact disk (CD). In other words, such a disk with relatively large pits and lands in low density can be successfully molded under a low pressure with a high viscosity of melted resin, which would hardly thrust into the clearance between the parts of the mold to cause the flash. For example, a polycarbonate disk molding disk for CD with its diameter of 120 mm and its thickness of 1.2 mm can be formed by an injection molding under the conditions of the maximum resin temperature of 320 degrees Celsius, the mold temperature of 70 degrees Celsius, the maximum injection velocity of 150 mm/s, the maximum clamping force of 196 kN and the tact time of 4 second.

On the contrary, in the case of a high density optical disk substrate adapted for a shorter wave length of light source such as of 400 nm level in which extremely smaller pits and lands are to be formed, a lower viscosity and high fluidity of the melted resin under higher pressure is required in the mold. In molding such a high density optical disk substrate with a lower viscosity of melted resin under higher pressure, the melted resin in apt to thrust into the clearance between the parts of the mold to cause a larger size of flash. For example, a polycarbonate disk molding disk for Blue-ray Disk (BD) with its diameter of 120 mm and its thickness of 11 mm has to be formed by an injection molding under the conditions of the maximum resin temperature of 380 degrees Celsius, the mold temperature of 120 degrees Celsius, the maximum injection velocity of 200 mm/s, the maximum clamping force of 196 kN and the tact time of 6 second.

Thus, in the case of the molding of an optical disk substrate for BD, a higher temperature of resin and a higher temperature of mold are required in comparison with in the case of an optical disk substrate for CD, so that a flash is likely to be formed at the inner hole 56*a* of the optical disk substrate 56. The embodiment mentioned above, however, separates the thin part of the melted resin connecting the sprue portion 64 to the inner hole 56*a* and pushes back one of the separated pieces toward the inner hole 56*a* by means of the high pressure gas, thereby preventing the flash from being formed under the condition of the higher resin temperature and the higher mold temperature.

In the embodiment shown in FIG. 3, a single pressure control circuit 23 controls the opening and closing of the electromagnetic valve 22 and the driving of the booster 20. A modification, however, may be possible in which separate control circuits control the opening and closing of the electromagnetic valve 22 and the driving of the booster 20, respectively.

In the Embodiment 1, the gap 62 between the sprue bush 3 and the stationary side fixing bush 4 is formed at a position substantially the same as the inside diameter of optical disk substrate 56. The gap, however, is not limited to the above. For example, a modification may be possible in which the gap 62 is formed at a position still closer to the center of optical disk substrate 56. In other word, the outer diameter of the sprue bush 3 and the inside diameter of the stationary side fixing bush 4 may be less than the inside diameter of optical disk substrate 56.

Figure 6:
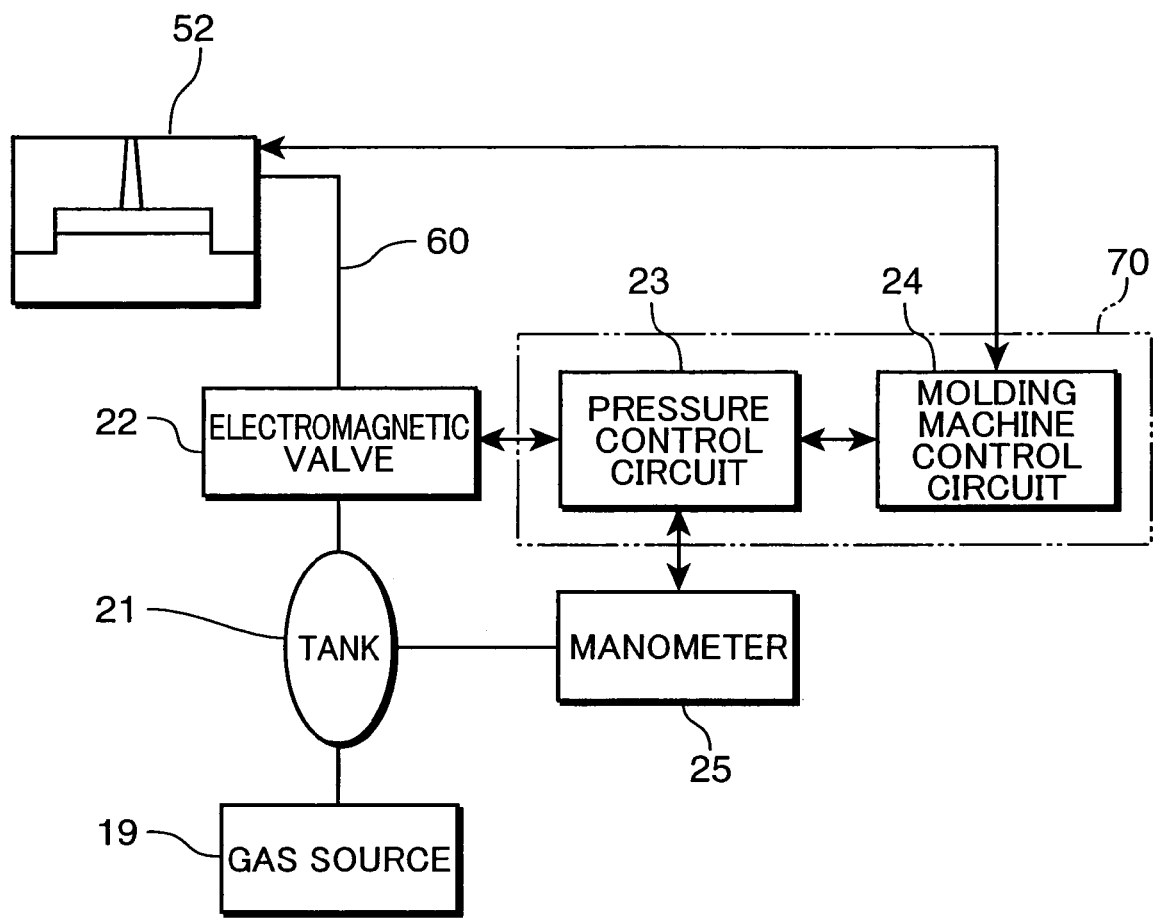
FIG. 6 is a diagram similar to FIG. 2 to show another configuration for the injection molding machine according to Embodiment 1 of this invention.

The Embodiment 1, in which the booster 20 is used, may be modified to do without such a booster 20 as shown in FIG. 6 if the gas source 19 of a high pressure such as a gas container in which a high pressure gas is filled is used. In this case, also the tank may be dispensed with.

In the Embodiment 1, gas flows through the gap 62 between the sprue bush 3 and the stationary side fixing bush 4. An alternative, however, is possible in which a hole is formed in a boundary surface between the sprue bush 3 and the stationary side fixing bush 4 for the gas to flow through the hole. A plurality of such holes may be arranged preferably in the boundary surface in circumferential direction with intervals therebetween.

The Embodiment 1 using air as the gas may be modified to use nitrogen as the gas.

Embodiment 2

Embodiment 2 is different from the Embodiment 1 in that the tank 21 has a smaller volume than that of Embodiment 1 and opening and closing of the electromagnetic valve 22 is controlled in a different manner. As the injection molding machine 50, the configuration shown in FIG. 3 is adopted. The following description is focused on the parts that are different from those of Embodiment 1, with explanation of the other parts being omitted.

In Embodiment 1, the volume of gas flowing through the clearance 66 is controlled by controlling the time of opening and closing the valve 22 with the pressure of the high pressure gas being substantially kept constant. In Embodiment 2, on the contrary, the capacity of the tank 21 is restricted so as to keep constant the gas volume stored in the tank 21 as well as its pressure just before opening of the electromagnetic valve 22 and not to supply the tank 21 with gas after the electromagnetic valve 22 is once opened, until the same is closed. The capacity of the tank is further determined so that the pressure of high pressure gas declines to a level less than the pressure of the melted resin by keeping the electromagnetic valve in an opening state. In other words, the time interval within which the high pressure gas can keep its pressure at a level capable of moving the melted resin in the clearance 66 is restricted by the capacity of the tank 21 and its pressure just before opening of the electromagnetic valve 22. The configuration of the injection mold 52 is the same as in Embodiment 1.

The pressure control circuit 23 receives a signal from the molding machine control circuit 24 when the cutter punch 12 advances to the projected position just in front of the sprue bush 3 as shown in FIG. 4. The pressure control circuit 23 in turn sends a signal to the electromagnetic valve 22 to open it. When the electromagnetic valve is thus opened, the high pressure gas stored in the tank 21 begins to flow into the clearance 66 by way of the gas pipe 60 and the gas passage 7. According to this, the gas pressure gradually declines. After a predetermined period of time has passed, the pressure control circuit 23 sends a signal to the electromagnetic valve 22 to close it. During the above period, the booster 20 is not driven, and no gas flow into the tank 21 is thus caused.

The predetermined period of time mentioned above is longer than the time taken for the gas pressure of the high pressure gas flowing into the clearance 66 to decline to a level less than the pressure of the melted resin, which time period is determined by an experiment or the like. Since the capacity of the tank 21 is small and the booster 20 is not driven while the electromagnetic valve 22 is open in Embodiment 2, the pressure of gas flowing into the clearance 66 declines as the gas flows from the tank into the mold.

The pressure control circuit 23 drives the booster 20 after the electromagnetic valve 22 is closed. And, the pressure control circuit 23 stops to drive the booster 20, receiving a signal from the manometer 25 indicating that the pressure in the tank 21 reaches a predetermined value. In this manner, the gas of the same pressure flows out in every shot.

It is preferable to set the capacity of the high pressure gas flowing system including the tank 21, e.g., the volume of the system from the tank 21 to the clearance 66 in the cavity 54, at a value not greater than 30 cm$^3$, and more preferably not greater than 20 cm$^3$. In other words, a gas volume which is too large would result in an excessive movement of resin out of the clearance 66 to cause a pocket or a bubble at the inner hole 56a of optical disk substrate 56. Further in the case of a gas pressure which is too high, a variation in gas volume coming out of the clearance 66 in circumferential directions is likely to occur, which causes a variation of gas volume shot by shot even if the gas flowing period is kept constant. If the gas volume is insufficient, on the contrary, the movement of resin out of the clearance 66 would be insufficient, which causes the flash at the inner hole 56a Accordingly, the capacity of high pressure gas flowing system including the tank 21 is necessary to be set at least capacity of 5 cm$^3$. The caliber of the gas pipe 60 is 6 mm in this case.

In Embodiment 2, it is preferable to condition the gas flow out of the clearance 66 with a pressure higher than the pressure of the melted resin by 2% or more and 10% or less, and more preferably by 3% or more and 8% or less.

In Embodiment 1, the capacity of the tank 21 is so large that the pressure of gas coming out of the clearance 66 is equal to the inside pressure of the tank 21. In Embodiment 2, on the contrary, the capacity of the tank 21 is so small that the inside pressure of the tank should be set at double of the case of Embodiment 1 provided that the capacity of the tank 21 and the capacity of the system from the electromagnetic valve 22 to the cavity 54 is the same.

It is preferable that the clearance 66 between sprue bush 3 and the cutter punch 12 is not greater than 0.1 mm, and more preferably not less than 10 µm and not greater than 50 µm.

As an exemplary test, the optical disk substrate 56 is formed by the injection molding machine 50 according to Embodiment 2 with air used as the gas. In this test, optical disk substrate 56 with outer diameter of 120 mm, inside diameter 15 mm and thickness of 1.1 mm is molded with polycarbonate under the condition that air is used as the high pressure gas, the capacity for the gas flowing system including the tank 21 is 20 cm$^3$, and the maximum pressure is 9.3 MPa. Other conditions are that the period of time for injecting the melted resin is 0.1 second and that the clamping force of 196 kN is applied for compression for a period of 0.1 second after 0.05 second past the filling of the melted resin, the clamping force being kept at 98 kN afterward. The cutter punch 12 is advanced to the projected position after 0.2 second past the filling with the melted resin. In this molding test, there is formed a round edge with its radius not greater than 0.1 mm at the inner hole 56a in the vicinity of a portion to which the high pressure gas outflows.

The features of embodiment 2 are summarized in the following discussion.

(1) According to the injection molding machine of this embodiment, the gas pipe is provided with a tank in the upstream of the valve. The capacity of the tank is so determined that the pressure of high pressure gas declines to a level less than the pressure of the melted resin by opening the electromagnetic valve. In this embodiment, since the gas pressure declines to a level less than the pressure of the melted resin due to the opening of the valve, the gas is incapable of pushing back the resin any more in that level. Thus, the volume of the gas which can flow into the clearance until the gas pressure declines to a level less than the resin pressure can be restricted by the capacity of the tank. This means that there is no necessity of controlling the time period for the valve to open in a high accuracy, thereby simplifying the control.

(2) According to the injection molding machine of this embodiment, the inside pressure of the tank before the opening of the valve is higher than the pressure of the melted resin by 2% or more and 10% or less, and, the capacity of the gas flowing system including the tank is set not less than 5 cm$^3$ and not greater than 30 cm$^3$. Accordingly, the gas pressure can decline without fail to a level less than the resin pressure by opening the valve.

(3) According to the injection molding method of this embodiment, the gas pressure declines to a level less than the resin pressure when the gas flows into the cavity. In the embodiment, since the gas pressure declines to a level less than the resin pressure, the gas is incapable of pushing back the resin any more in that level. Thus, there is no necessity of controlling with a high accuracy the time period for the gas to flow into the cavity, resulting in simpleness of the control.

In the Embodiment 2, the gap 62 between the sprue bush 3 and the stationary side fixing bush 4 is formed at a position substantially the same as the circumferential surface defining the inner hole of optical disk substrate 56. The position of the gap, however, is not limited to the above. For example, a modification may be possible in which the gap 62 is formed at a position still closer to the center of the optical disk substrate 56. In other word, the outer diameter of the sprue bush 3 and the inside diameter of the stationary side fixing bush 4 may be less than the diameter of the inner hole of the optical disk substrate 56.

Embodiment 3

Figure 7:
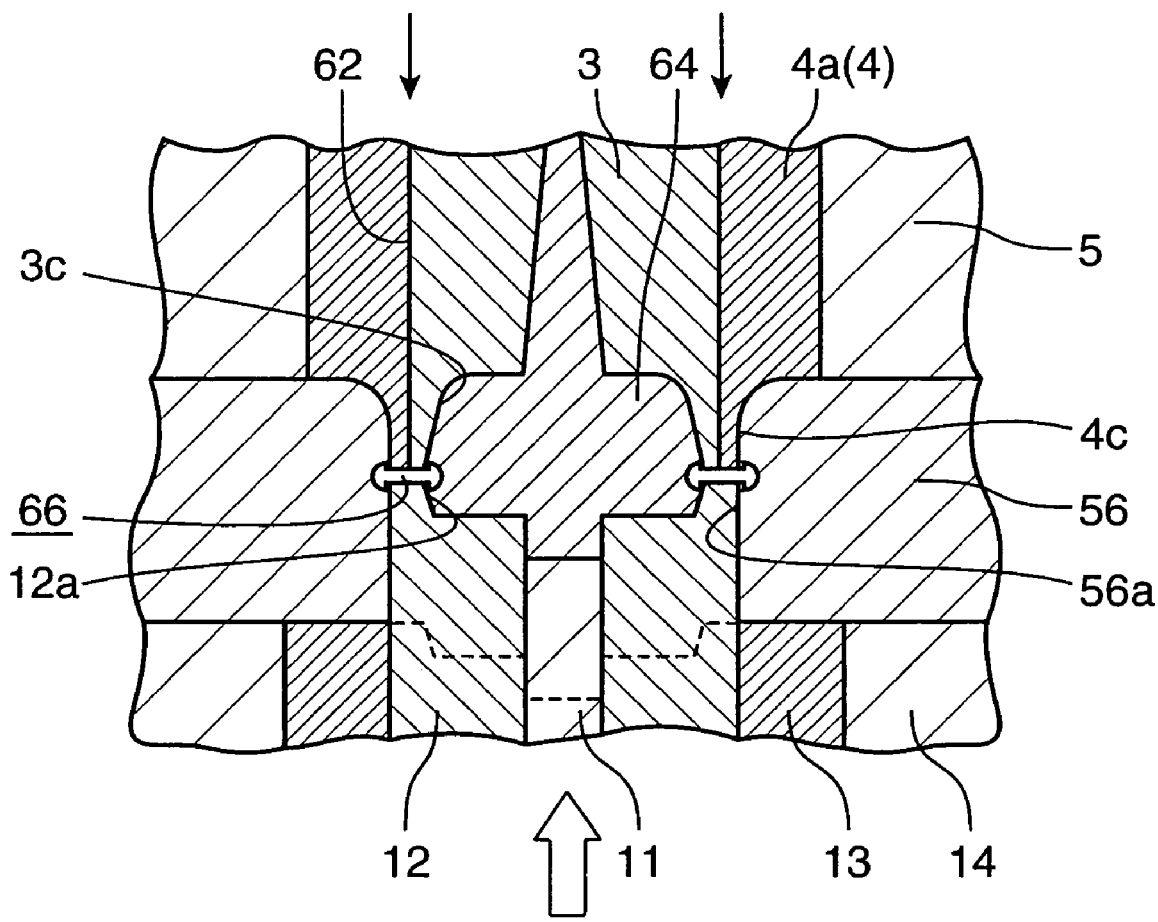
FIG. 7 is a cross sectional view similar to FIG. 4 to show the injection mold relating to Embodiment 3 of this invention.

FIG. 7 shows a principal part of the injection mold 52 used in the injection molding machine according to Embodiment 3 of this invention. Embodiment 3 is different from Embodiment 1 in the configuration of the sprue bush 3, the stationary side fixing bush 4 and the cutter punch 12. The following description is focused on the parts that are different from those of Embodiment 1, with explanation of the other parts being omitted.

The cylindrical portion 4a of the stationary side fixing bush 4 is made annular in such a manner that the outside portion of the inside end of the cylindrical portion 4a flushes with the stamper holder 5 and that an inside portion 4c extends from the outside portion into the cavity 54 toward the cutter punch 12. The end surface of the inside portion 4c of the stationary side fixing bush 4 is formed in a circular plane. The inside portion 4c forms almost half of the inner hole 56a of the optical disk substrate 56. The inside portion 4c of the stationary side fixing bush 4 extending in a smooth carve in its outer surface functions to make the shape of one end (on the upper side in FIG. 7) of the inner hole 56a round in the optical disk molding substrate 56.

An outside portion 3c of the sprue bush 3 also extends toward the cutter punch 12 as in the case of the stationary side fixing bush 4. The end of the outside portion 3c of the sprue bush 3 is formed in a circular plane flushing with the end of the inside portion 4c of the stationary side fixing bush 4.

The outer diameter of the cutter punch 12 is approximately the same as that of the inside portion 4c of the stationary side fixing bush 4. The cutter punch 12 projecting to its projected position forms the gas flowing out clearance 66 as a circular clearance enclosed by the outside portion 3c of the sprue bush 3, the inside portion 4c of the stationary side fixing bush 4 and the outer portion of the concave portion 12a of the cutter punch 12. In other words, the gas flowing out clearance 66 is formed at the midway in the direction of the thickness of the optical disk substrate 56. Thus, a pocket in the inner hole 56*a* caused by the high pressure gas flow, if any, would be at the midway in the direction of the thickness of the optical disk substrate 56.

The cutter punch 12 and the ejector pin 11 are in their normal positions as shown by broken lines in FIG. 7 when the melted resin is to be injected. This makes it easy to inject the resin into the cavity 54. When a predetermined time has elapsed from the time of the injection in which the resin remains melted, the cutter punch 12 and the ejector pin 11 with their relative positions kept are advanced in the direction of the white arrow in FIG. 7. The cutter punch 12 stops just in front of the sprue bush 3 and the stationary side fixing bush 4. Thus, the gas flowing clearance 66 is left between the cutter punch 12, the sprue bush 3 and the stationary side fixing bush 4.

Next, the high pressure gas from the gas passage 7 flows into the gas flowing clearance 66 by way of the gap 62 between the sprue bush 3 and the stationary side fixing bush 4 as shown in the downwardly directed allows in FIG. 7. Accordingly, the melted resin moves out of the gas flowing clearance 66. Thus, there is no flash formed at the inner hole 56*a* of the optical disk substrate 56 upon the solidification of the resin.

The gas flowing clearance 66 is preferably not greater than 0.1 mm, and more preferably not less than 10 μm and not greater than 50 μm. In this case, a pocket caused by the gas at the inner hole 56*a* will be of a radius not greater than 0.1 mm.

In Embodiment 3, the gas flowing clearance 66 is enclosed by planes facing to each other, too high pressure gas flowing directly to the clearance 66 to push out the resin in the clearance 66 at first by the high pressure gas, so that the volume of resin to be moved can be controlled easily.

In Embodiment 3, the end of the inner hole 56*a* on the side of the ejector 13 is also made round in the resultant optical disk substrate 56. This structure is considered to be for the reasons that the projecting movement of the cutter punch 12 generates a force to push back the resin which otherwise thrusts into the gap between the cutter punch 12 and the ejector 13, and that an insufficient pressure on the resin at the end of the inner hole 56*a* causes a higher degree of shrinkage thereof than that of the resin in the other part under a sufficient pressure.

Although a pocket may be caused on the wall defining the inner hole 56*a* at the midway in the direction of the thickness of the optical disk substrate 56 in Embodiment 3, there is no flash or sink mark caused. Such a pocket at the midway of the inner hole 56*a* has no influence on a centering of the disk if the optical disk is supported with the ends of the inner hole 56*a* as in the case of setting the disk in the optical disk driver.

The feature of embodiment 3 is summarized as follows.

(1) This embodiment is so constructed that the gas coming to the cavity directly flows into the clearance. This means that the gas coming to the cavity flows into the clearance without passing through another place in the cavity, which strengthens the correlation between the volume of the gas flowing into the cavity and the volume of the resin going out of the cavity. Thus, the volume of the resin to be moved can be accurately controlled.

Embodiment 4

Figure 8:
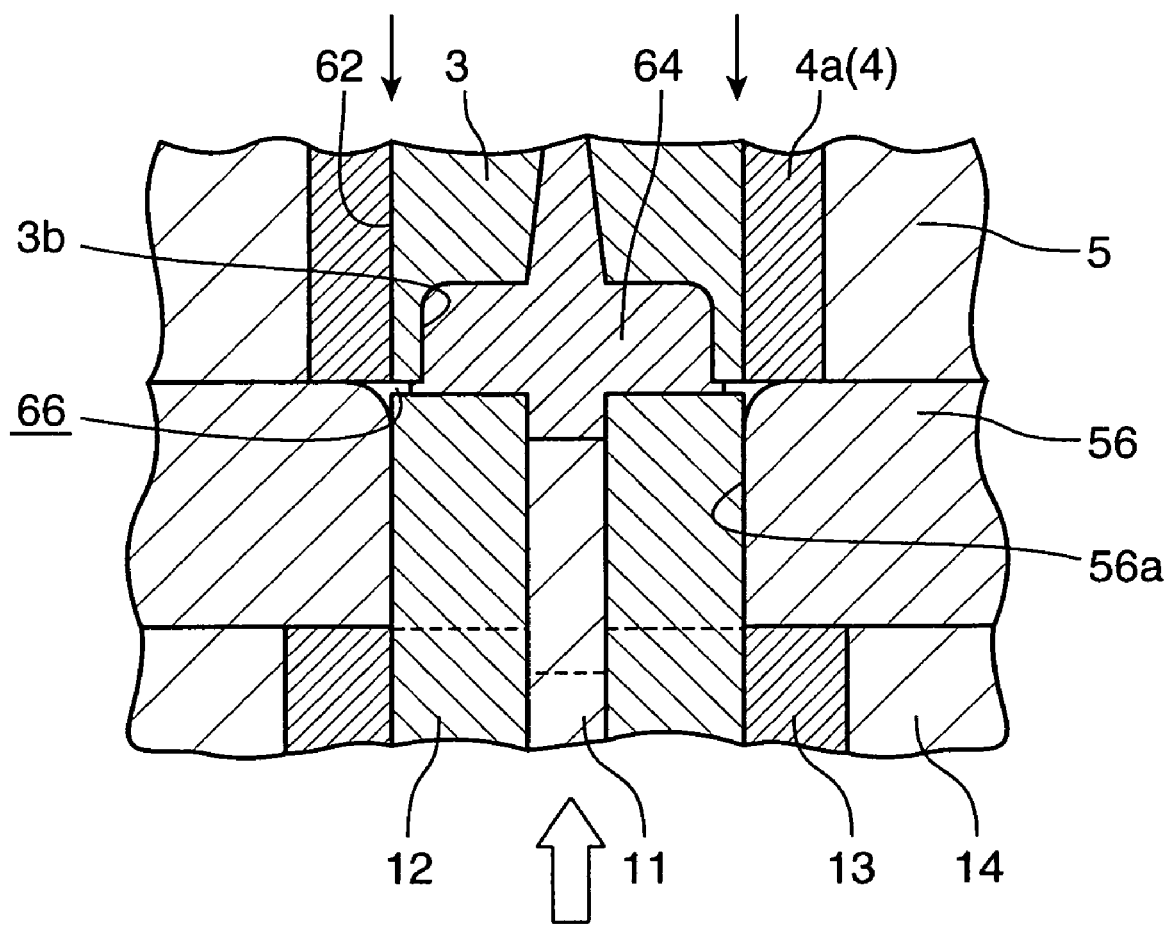
FIG. 8 is a cross sectional view similar to FIG. 4 to show the injection mold relating to Embodiment 4 of this invention.

FIG. 8 shows a principal part of the injection mold 52 used in the injection molding machine according to Embodiment 4 of this invention. Embodiment 4 differs from Embodiment 1 in that the inside end of the cutter punch 12 is plane. The following description is focused on the parts that are different from those of Embodiment 1 with explanation of other parts omitted.

There is no concave portion 12*a* formed at the inside end of the cutter punch 12. In other words, at least one concave portion on one of the sprue bush 3 or the cutter punch 12 is sufficient to secure a necessary volume of resin for the sprue portion 64 to be pushed out by the projection of the cutter punch 12.

It is preferable to determine the gap 62 between the sprue bush 3 and the stationary side fixing bush 4 to a diameter equal to the inside diameter of the inner hole 56*a* of the optical disk substrate 56, i.e., the outer diameter of the cutter punch 12 or the less. If the gas flowing clearance 66 is enclosed by planes facing to each other, the melted resin existing in the clearance 66 is at first pushed out by the high pressure gas, which makes it easy to control the volume of the resin to be moved.

Also in Embodiment 4, the melted resin is pushed back by the high pressure gas flowing into the gas flowing clearance 66 between the sprue bush 3 and the cutter punch 12, the resin being to be cooled to solidify as the gas pressure declines. Thus, the end of the inner hole 56*a* is made round in the optical disk substrate 56 without a flash.

The gas flowing clearance 66 is preferably not greater than 0.1 mm, and more preferably not less than 10 μm and not greater than 50 μm. In this case, a pocket caused by the gas at the wall defining the inner hole 56*a* is of a radius not greater than 0.1 mm.

Figure 9:
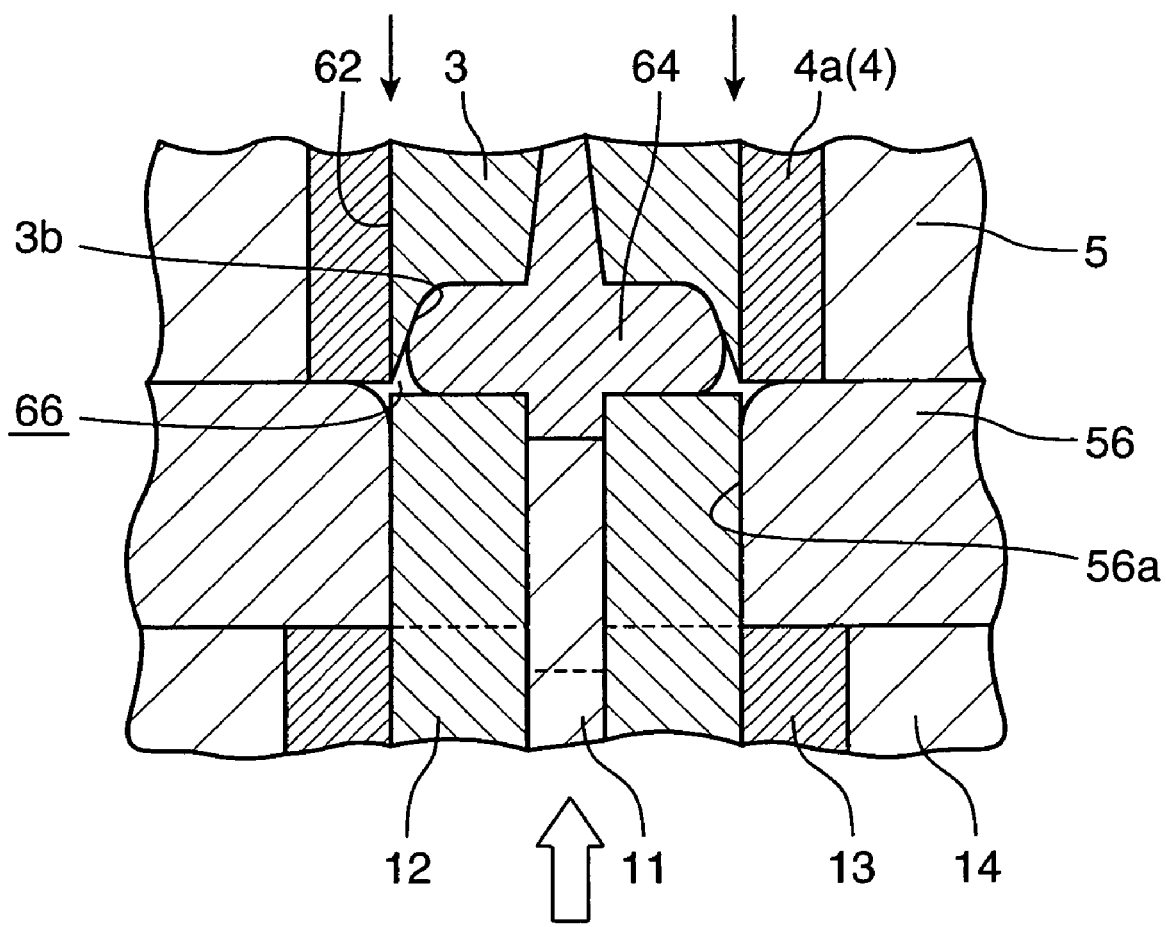
FIG. 9 is a cross sectional view similar to FIG. 4 to show a modification of the injection mold relating to Embodiment 4 of this invention.

In Embodiment 4, the concave portion 3*b* is formed at the inside end of the sprue bush 3 with a plane peripheral portion being left. A modification, however, is possible that the concave portion 3*b* is formed at the inside end of the sprue bush 3 without the plane peripheral portion being left as shown in FIG. 9. The same result can be obtained also in this modification.

Embodiment 5

Figure 10:
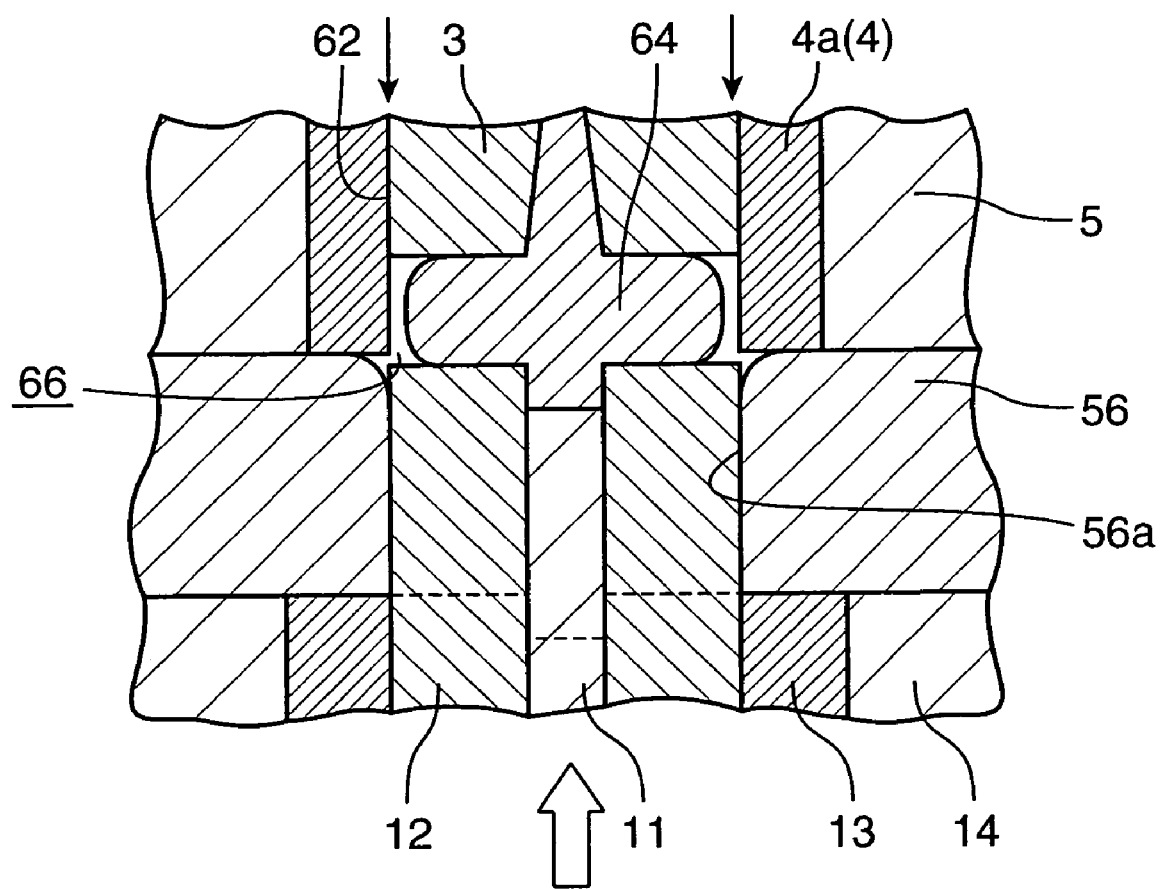
FIG. 10 is a cross sectional view similar to FIG. 4 to show the injection mold relating to Embodiment 5 of this invention.

FIG. 10 shows a principal part of the injection mold 52 used in the injection molding machine according to Embodiment 5 of this invention. Embodiment 5 differs from Embodiment 1 in that the sprue bush 3 retracts with respect to the stationary side fixing bush 4. The following description is focused on the parts that are different from those of Embodiment 1 with explanation of other parts omitted.

The inside end of the sprue bush 3 is made plane. In other words, the inside end of the sprue bush 3 is not formed with the concave portion 3*b*. Instead, the inside end retracts in the direction apart from the cutter punch 12 more than the inside end of the stationary side fixing bush 4. Accordingly, the clearance between the sprue bush 3 and the cutter punch 12 in its projected position is not so narrow as in the case of Embodiment 1.

Between the cutter punch 12 and the stationary side fixing bush 4, on the other hand, a narrow clearance 66 is formed. Accordingly, the high pressure gas coming out of the gap 62 between the sprue bush 3 and the stationary side fixing bush 4 advances and compresses the melted resin of low density around the sprue portion 64 to reach the clearance 66 between the stationary side fixing bush 4 and the cutter punch 12. And, the high pressure gas pushes the resin existing at the end of the inner hole 56*a* into the side of the optical disk substrate 56. The resin is to be cooled to solidify as the gas pressure declines. Thus, the end of the inner hole 56*a* is made round without a flash.

At the other end of the inner hole 56*a*, a higher degree of shrinkage of the resin is caused to make the other end round shape by the movement of the cutter punch 12 in the direction against the movement of the melted resin to thrust into a gap between the cutter punch 12 and the ejector 13 and by an insufficient pressure in the vicinity thereof.

The gas flowing clearance 66 between the stationary side fixing bush 4 and the cutter punch 12 is preferably not greater than 0.1 mm, and more preferably not less than 10 µm and not greater than 50 µm. In this case, the radius of curvature of the end of the inner hole 56a on the side of the stationary side fixing bush 4 is not greater than 0.1 mm.

Figure 11:
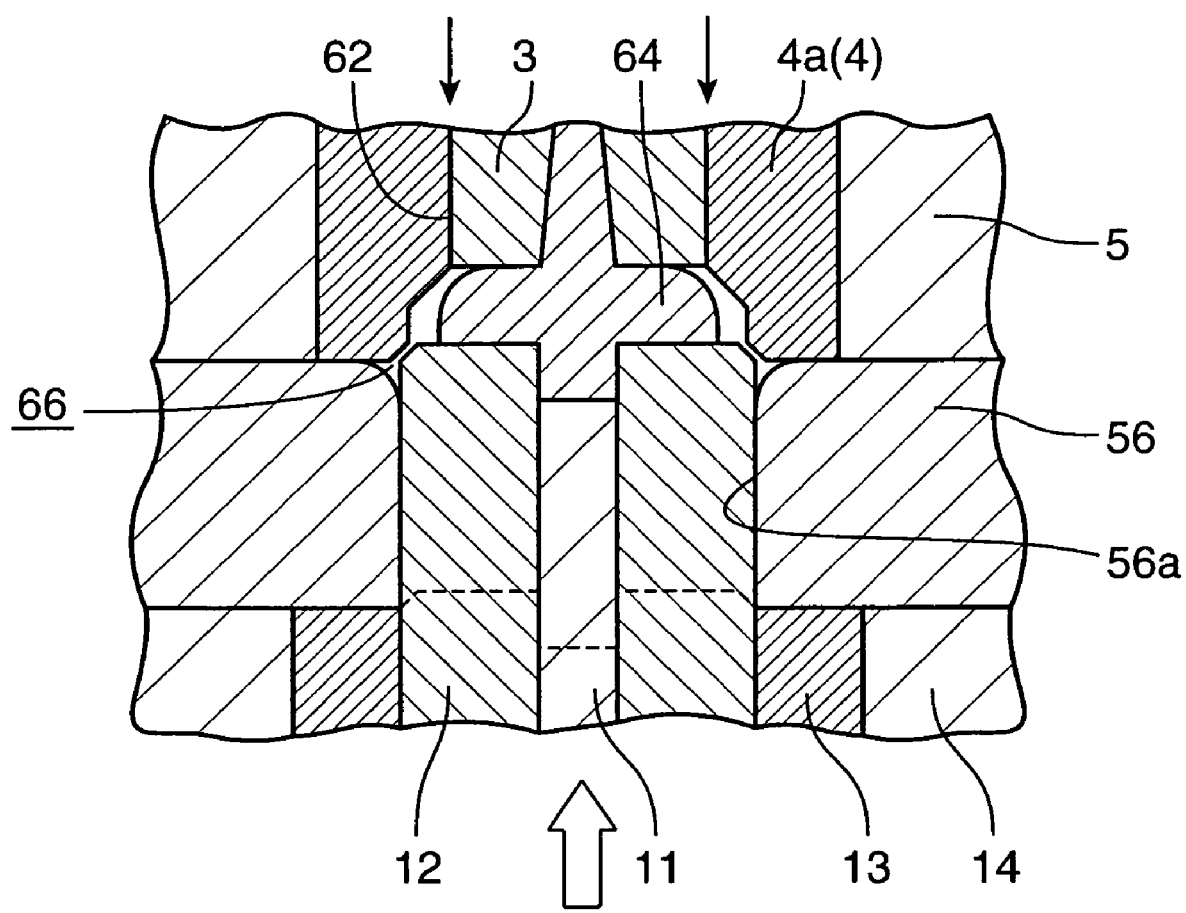
FIG. 11 is a cross sectional view similar to FIG. 4 to show a modification of the injection mold relating to Embodiment 5 of this invention.

In FIG. 10, the outer diameter of the sprue bush 3 is designed to be approximately equal to the diameter of the inner hole 56a of the disk, i.e., the outer diameter of the cutter punch 12. However, the outer diameter of the sprue bush 3 may be less than the diameter of the inner hole 56a as shown in FIG. 11. In this case, the gap 62 between the sprue bush 3 and the stationary side fixing bush 4 is located closer to the center than the inner hole 56a of the disk. Similarly in this case, the high pressure gas reaches the clearance 66 by way of the periphery of the sprue portion 64 to push the resin out of the clearance 66 toward the substrate 56.

As seen from FIG. 11, the edge of the inside end of the cutter punch 12 and the edge of the inside end of the stationary side fixing bush 4 may be chamfered. In such a case, the cutter punch 12 should be designed to be nested inside the stationary side fixing bush 4 for preventing the clearance 66 between the stationary side fixing bush 4 and the cutter punch 12 from being excessively widened.

Embodiment 6

Figure 12:
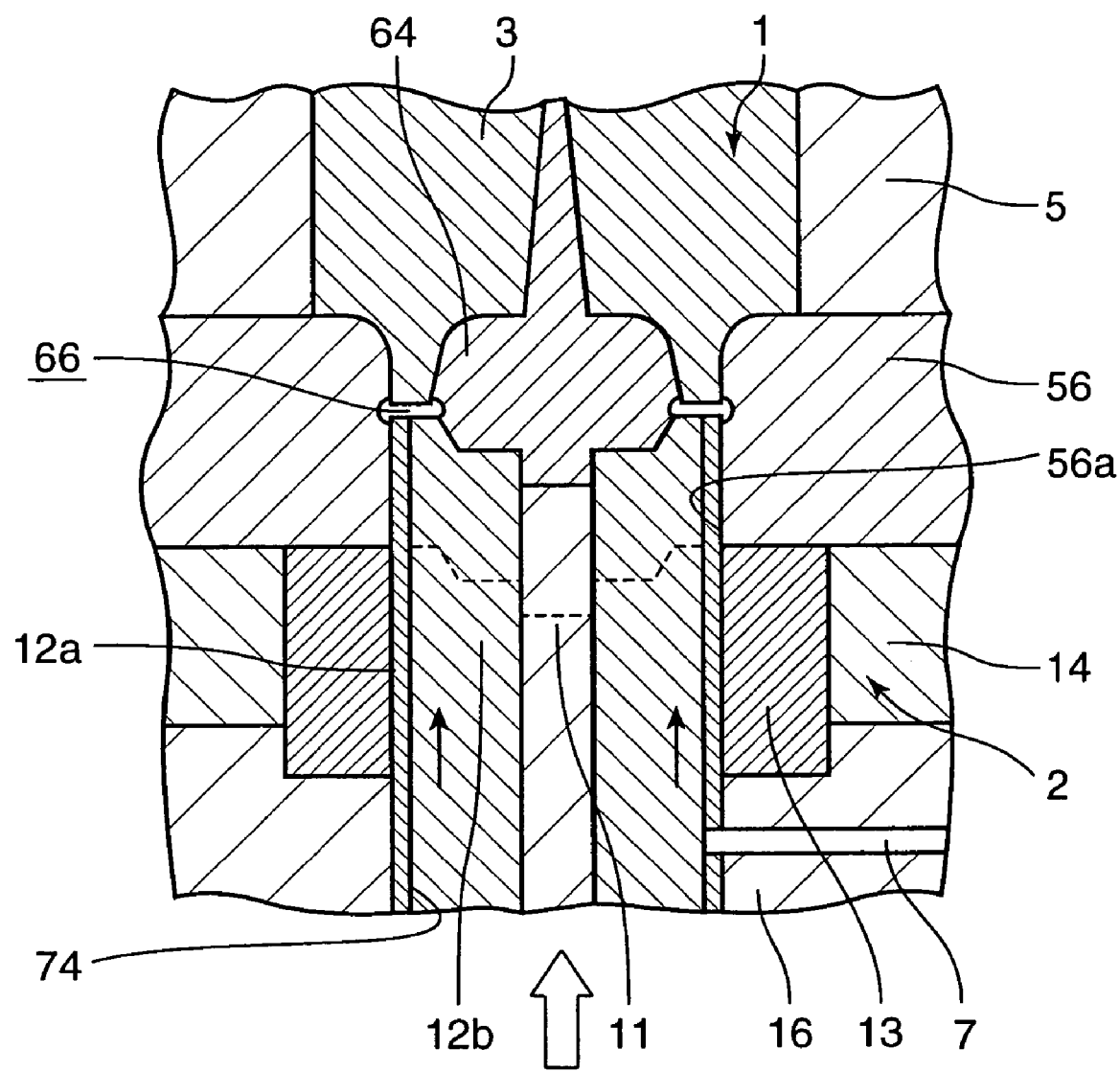
FIG. 12 is a cross sectional view similar to FIG. 4 to show the injection mold relating to Embodiment 6 of this invention.

FIG. 12 shows a principal part of the injection mold 52 used in the injection molding machine according to Embodiment 6 of this invention. Embodiment 6 differs from Embodiment 1 in that the gas passage 7 is located in the movable mold 2. The following description is focused on parts that are different from those of Embodiment 1 with explanation of other parts omitted.

In Embodiment 1, the stationary mold 1 is provided with the sprue bush 3 and the stationary side fixing bush 4. In this embodiment, on the contrary, the stationary side fixing bush 4 is dispensed with, and that the sprue bush 3 has an outer diameter greater than that of the inner hole 56a of the optical disk substrate 56.

The cutter punch 12 in the movable mold 2 is of a double structure including the outer cylinder 12a and an inside cylinder 12b. The gas passage 7, which communicates with a gap 74 between an outer cylinder 12a and the inside cylinder 12b, is formed in the movable base plate 16. Thus, the high pressure gas coming through the gas passage 7 is to flow through the circular gap 74 between the outer cylinder 12a and the inside cylinder 12b.

The outer cylinder 12a, the inside cylinder 12b and the ejector pin 11 are in the positions denoted by broken line in FIG. 12 when the stationary mold 1 and the movable mold 2 are closed to prepare for the injection of the melted resin. After the injection of the melted resin, the outer cylinder 12a, the inside cylinder 12b and the ejector pin 11 are advanced, with their relative positions being kept, in the direction of the white arrow into positions where the outer cylinder 12a and the inside cylinder 12b are just before coming into contact with the sprue bush 3 as shown in FIG. 12. In this situation, the high pressure gas coming through the gap 74 between the outer cylinder 12a and the inside cylinder 12b flows into the gas flowing clearance 66 between the sprue bush 3 and the cutter punch 12. Thus, there is no flash formed at the inner hole 56a due to the resultant movement of the melted resin.

The clearance 66 between the stationary side fixing bush 4 and the cutter punch 12 is preferably not greater than 0.1 mm, and more preferably not less than 10 µm and not greater than 50 µm. In this case, a pocket caused by the gas at the inner hole 56a is of a radius not greater than 0.1 mm.

The feature of Embodiment 6 is summarized in the followings.

(1) According to this embodiment, the movable portion includes the outer cylinder and the inside cylinder, the gas passage being designed to communicate with the clearance by way of the gap between the outer cylinder and inside cylinder. Accordingly, the gas passage can communicate with the cavity by way of the gap without any necessity of forming the gas passage itself to communicate the cavity.

Embodiment 7

Figure 13:
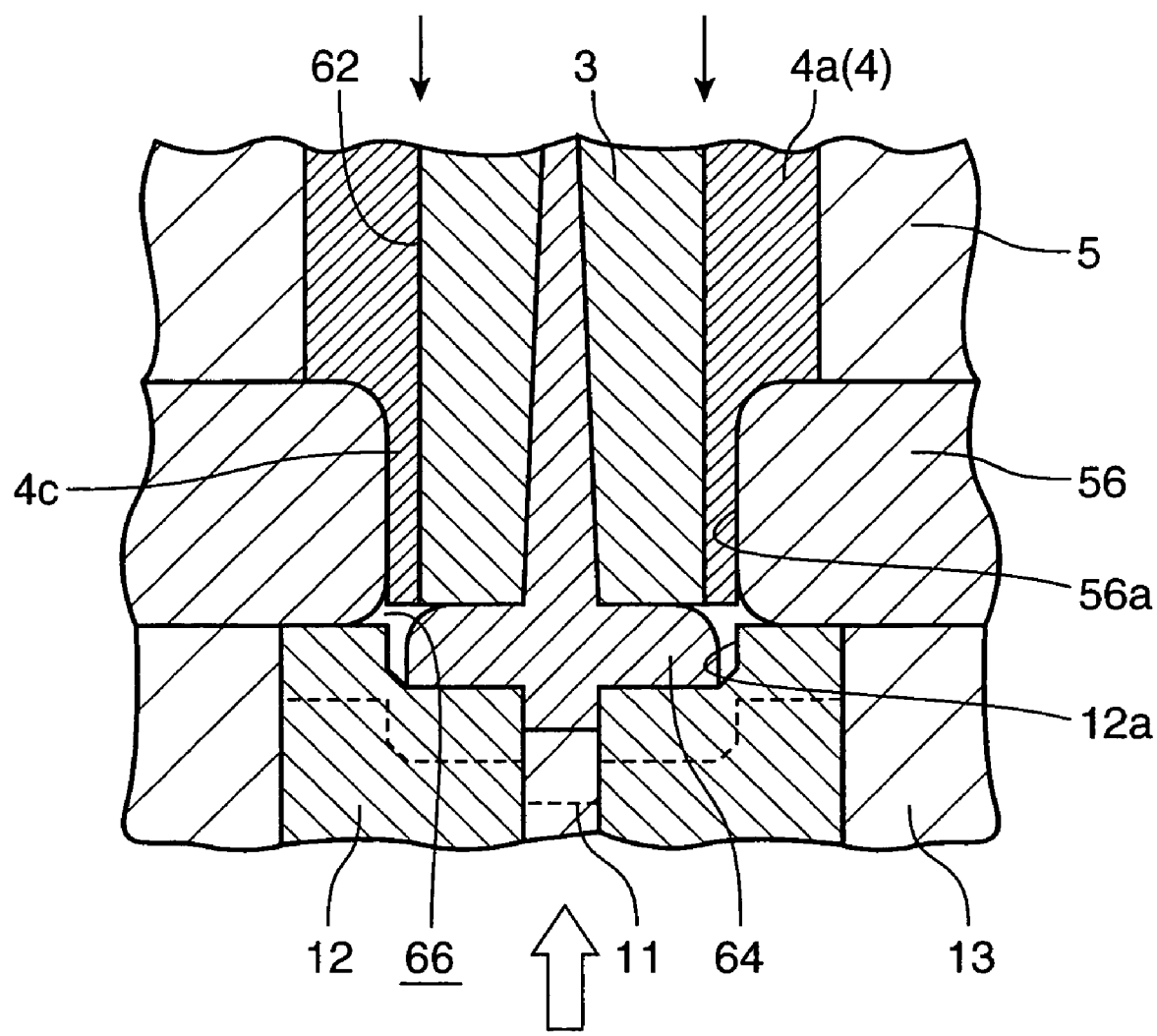
FIG. 13 is a cross sectional view similar to FIG. 4 to show the injection mold relating to Embodiment 7 of this invention.

FIG. 13 shows a principal part of the injection mold 52 used in the injection molding machine according to Embodiment 7 of this invention. Embodiment 7 differs from that in Embodiment 1 in that the cutter punch 12 in its normal position retracts with respect to the ejector 13. The following description is focused on the parts different from those of Embodiment 1 with explanation of the other parts being omitted.

The cylindrical portion 4a of the stationary side fixing bush 4 is made annular in such a manner that the outside portion of the inside end of the cylindrical portion 4a flushes with the stamper holder 5 and that the inside portion 4c extends from the outside portion into the cavity 54 toward the cutter punch 12. The end of the inside portion 4c of the stationary side fixing bush 4 is formed in a circular plane located in the vicinity of the inside end of the ejector 13. The inside portion 4c of the stationary side fixing bush 4 forms almost the inner hole 56a of the optical disk substrate 56. The inside portion 4c of the stationary side fixing bush 4 extending in a smooth curve in its outer surface functions to make the shape of one end (on the upper side in FIG. 13) of the inner hole 56a round in the optical disk molding substrate 56.

The sprue bush 3 also extends toward the cutter punch 12 as in the case of the stationary side fixing bush 4. The end (e.g., inside end) of the sprue bush 3 is formed in a circular plane flushing with the end of the inside portion of the stationary side fixing bush 4. The sprue bush 3 is not formed with the concave portion 3b at its end.

The cutter punch 12 has an outer diameter greater than the outer diameter of the stationary side fixing bush 4, the concave portion 12a formed at its end being of an inner diameter approximately the same as another diameter of the inside portion 4c of the stationary side fixing bush 4. The cutter punch 12 in its normal position is so located that the outside portion of the concave portion 12a at its end retracts with respect to the ejector 13 (e.g., the movable mirror surface plate 15) as shown with broken line in FIG. 13. Due to such a retraction of the cutter punch 12, the melted resin can flow into the cavity 54 even if the sprue bush 3 and the stationary side fixing bush 4 project by a degree of the thickness of optical disk substrate 56.

After the injection of the melted resin, the cutter punch 12 and the ejector pin 11 are advanced, with their relative positions being kept, in the direction of the white arrow into positions just in front of the stationary side fixing bush 4. The stopping position is so set that the inside end of the outside portion of the cutter punch 12 almost flushes with the inside end of the ejector 13. This makes the optical disk substrate 56 flat in the vicinity of the inner hole 56a.

The high pressure gas coming form the gas passage 7 flows into the cavity 54 through the gap 62 between the sprue bush 3 and the stationary side fixing bush 4. The resin in the cavity 54, which is still melted in this stage, is separated by the high pressure gas into the sprue portion 64 located within the concave portion 12a of the cutter punch 12 and the optical disk substrate 56 located outside of the stationary side fixing bush 4 with the resin forming the end of the inner hole 56a of the optical disk substrate 56 pushed toward the side of the optical disk substrate 56. The resin is to be cooled to solidify as the gas pressure declines. Thus, the end of the inner hole 56a is made round without a flash.

The clearance 66 between the stationary side fixing bush 4 and the cutter punch 12 is preferably not greater than 0.1 mm, and more preferably not less than 10 μm and not greater than 50 μm. In this case, a pocket caused by the gas at the end of the inner hole 56a is of a radius not greater than 0.1 mm.

In Embodiment 7, the inside diameter of the concave portion 12a of the cutter punch 12 is approximately the same as the diameter of the inner hole of the optical disk substrate 56. However, the concave portion 12a may have a less diameter.

Embodiment 8

Figure 14:
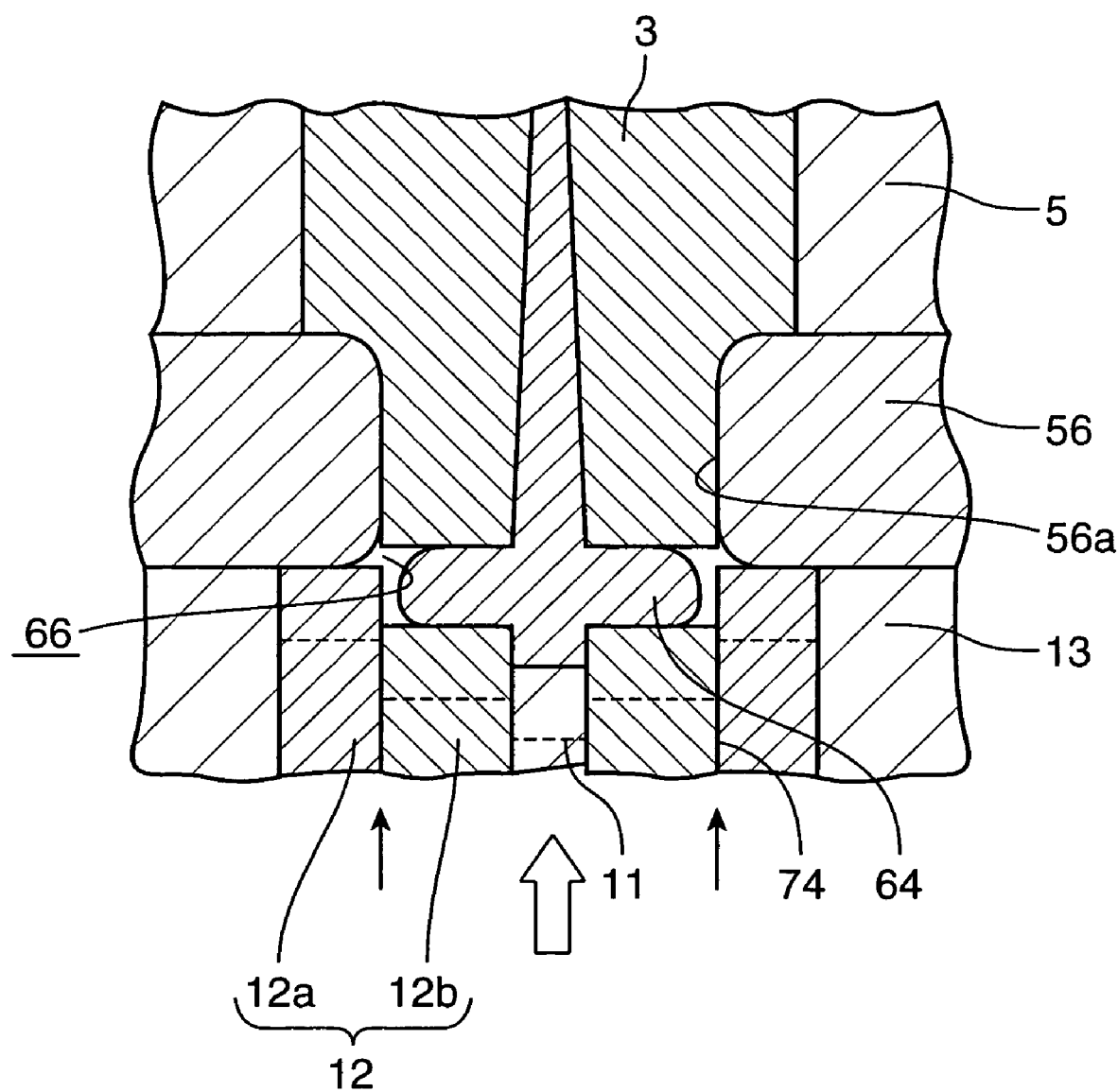
FIG. 14 is a cross sectional view similar to FIG. 4 to show the injection mold relating to Embodiment 8 of this invention.

FIG. 14 shows a principal part of the injection mold 52 used in the injection molding machine according to Embodiment 8 of this invention. Embodiment 8 differs from that in Embodiment 7 in that the high pressure gas flows in the movable mold 2. The following description is focused on the parts that are different from those of Embodiment 7 with explanation of the other parts being omitted.

Embodiment 8 is dispensed with the stationary side fixing bush 4. And, the sprue bush 3 is of an outer diameter greater than the position of the inner hole of optical disk substrate 56. The sprue bush 3 is extended into the cavity 54 toward the cutter punch 12. The end portion of the sprue bush 3 extending into the cavity 54 is partially removed in a shape to form the inner hole 56a. The extended portion of the sprue bush 3 has an outer diameter equal to an inner diameter of the inner hole 56a of the optical disk substrate 56. The end of the sprue bush 3 is formed in a circular plane located in the vicinity of the inside end surface of the ejector 13.

The cutter punch 12 is of a double structure including the outer cylinder 12a and the inside cylinder 12b. The gas passage 7, which communicates with the gap 74 between the outer cylinder 12a and the inside cylinder 12b, is formed in the movable base plate 16. Thus, the high pressure gas coming through the gas passage 7 is to flow through the circular gap 74 between the outer cylinder 12a and the inside cylinder 12b.

The outer cylinder 12a has an outer diameter greater than the outer diameter of the stationary side fixing bush 4, while the inside cylinder 12b has an inside diameter approximately the same as the outer diameter of the inside surface of the sprue bush 3. The cutter punch 12 in its normal position is so located that the inside end of the outer cylinder 12a retracts with respect to the ejector 13 (e.g., movable mirror surface plate 15) as shown with broken line in FIG. 14. Due to such retraction of the cutter punch 12, the melted resin can flow into the cavity 54 even if the sprue bush 3 projects by a degree of the thickness of optical disk substrate 56.

After the injection of the melted resin, the outer cylinder 12a, the inside cylinder 12b and the ejector pin 11 are advanced, with their relative positions being kept, in the direction of the white arrow into positions just in front of the sprue bush 3 as shown with the solid line in FIG. 14. And, while the resin is still melted, the high pressure gas flows into the cavity 54 through the gap 74 between the outer cylinder 12a and the inside cylinder 12b. The high pressure gas advances and compresses the melted resin of low density around the sprue portion 64 to reach the clearance 66 between the sprue bush 3 and the outer cylinder 12a. And, the high pressure gas pushes the resin existing at the end of the inner hole 56a into the side of the optical disk substrate 56. The resin is to be cooled to solidify as the gas pressure declines. Thus, the end of the inner hole 56a is made round without a flash.

The clearance 66 between the outer cylinder 12a of the cutter punch 12 and the sprue bush 3 is preferably not greater than 0.1 mm, and more preferably not less than 10 μm and not greater than 50 μm. In this case, a pocket caused by the gas at the inner hole 56a is of a radius less than 0.1 mm.

In this case, the outer cylinder 12a in its projected position and the ejector pin 11 are preferably designed to face to the substrate at almost the same height to make the optical disk substrate 56 flat in the vicinity of the inner hole 56a.

In Embodiment 8, the outer diameter of the end of the sprue bush 3, which corresponds to the diameter of the inner hole of optical disk substrate 56, is designed to be approximately the same as the inside diameter of the outer cylinder 12a. The outer cylinder 12a may be modified to have an inside diameter less than the outer diameter of the end of the sprue bush 3 since the sprue bush 3 does not come into contact with the outer cylinder 12a.

Embodiment 9

Figure 15:
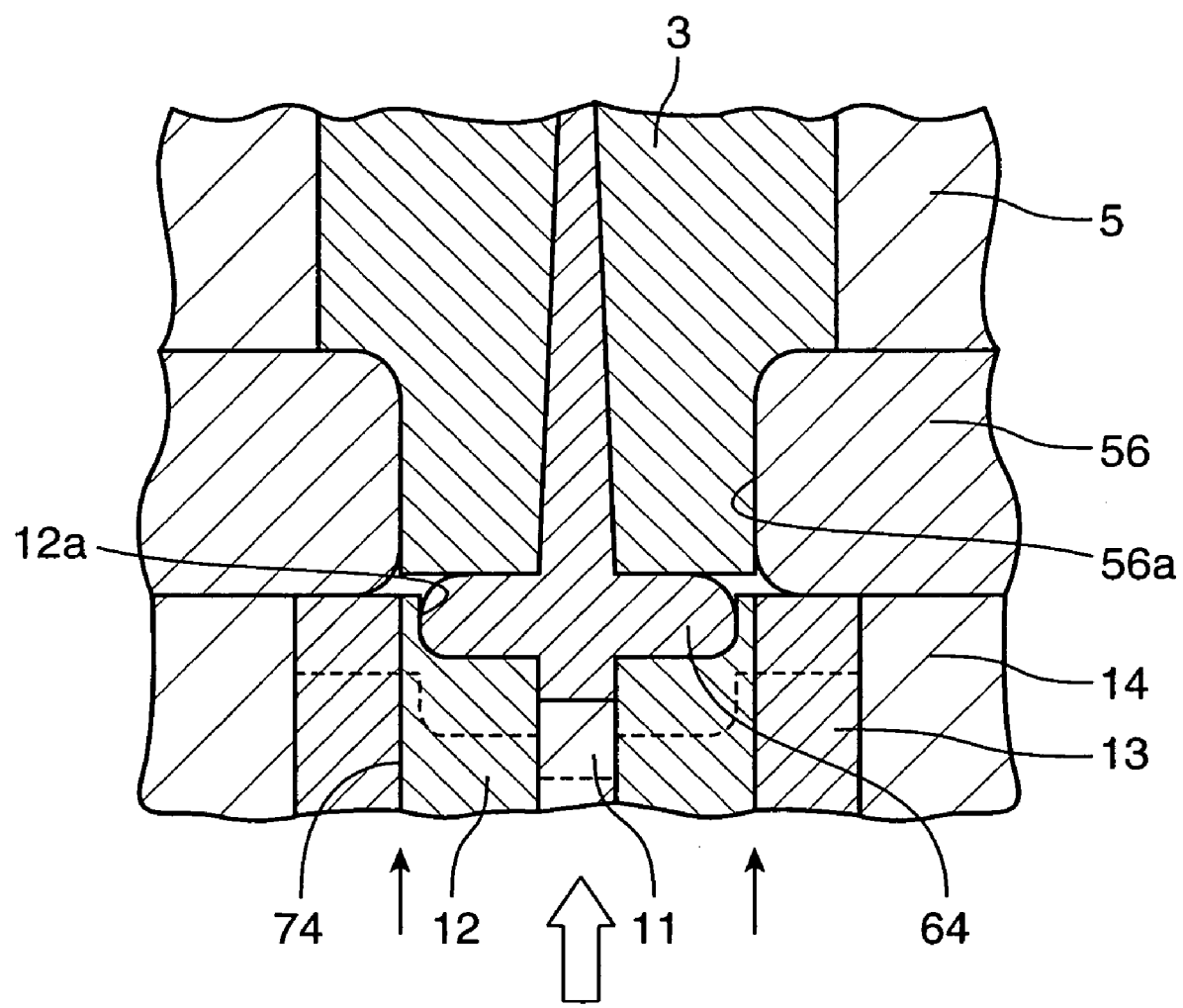
FIG. 15 is a cross sectional view similar to FIG. 4 to show the injection mold relating to Embodiment 9 of this invention.
Figure 16:
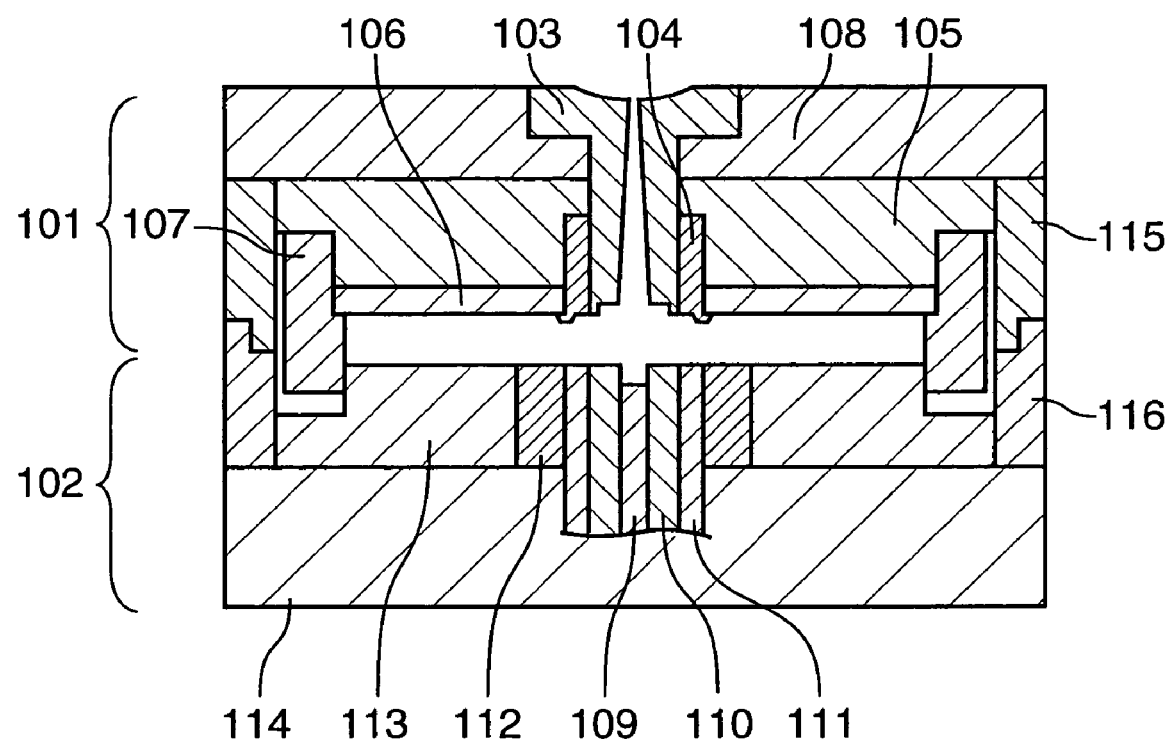
FIG. 16 shows a conventional mold for the optical disk substrate.
Figure 17A:
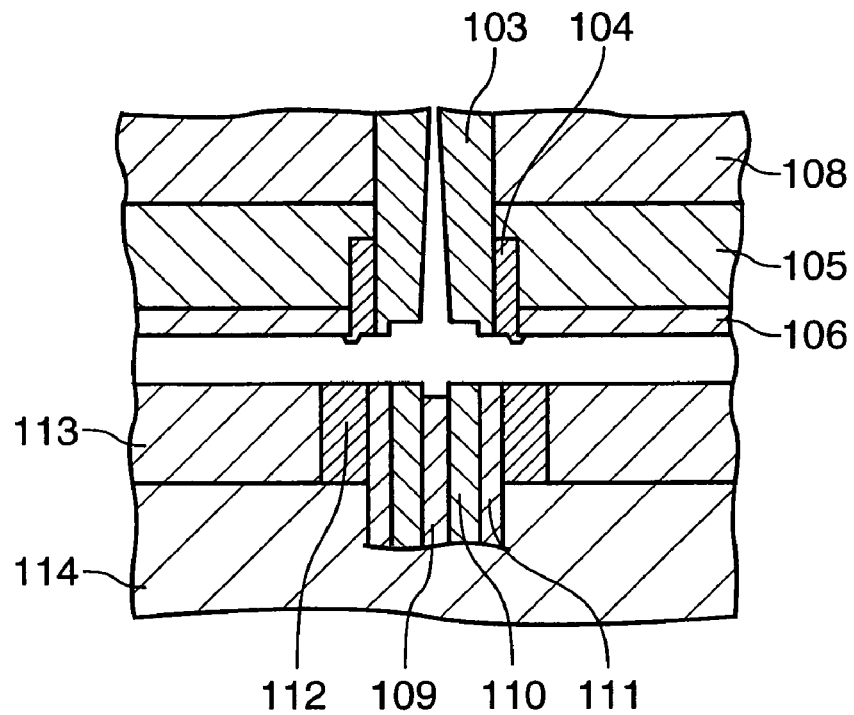
FIG. 17A is a partial cross sectional view of the conventional mold for the optical disk substrate upon injection of the melted resin.
Figure 17B:
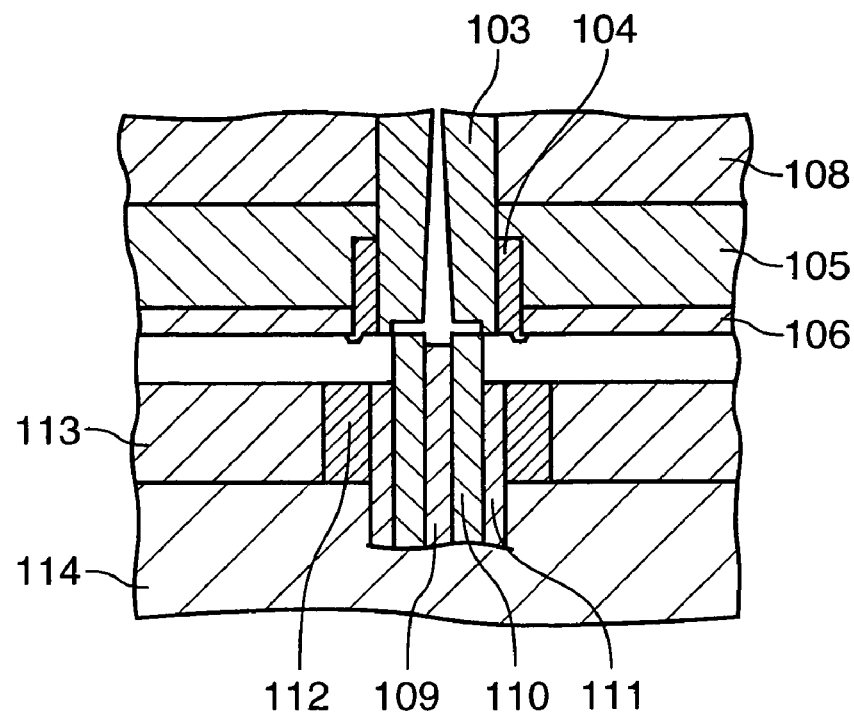
FIG. 17B is a cross sectional view of the same conventional mold upon forming the inner hole in the optical disk substrate.
Figure 18A:
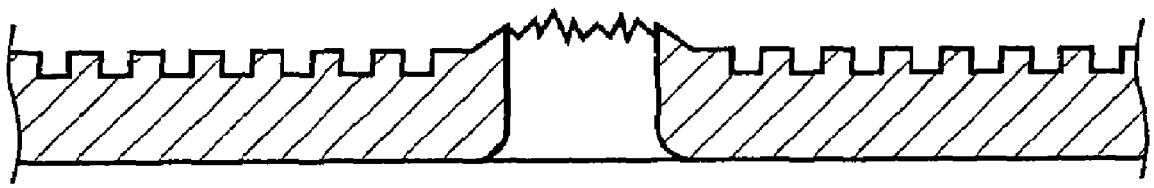
FIGS. 18A, 18B and 18C are cross sectional views of the optical disk forming disks formed by the conventional injection molding machine.
Figure 18B:
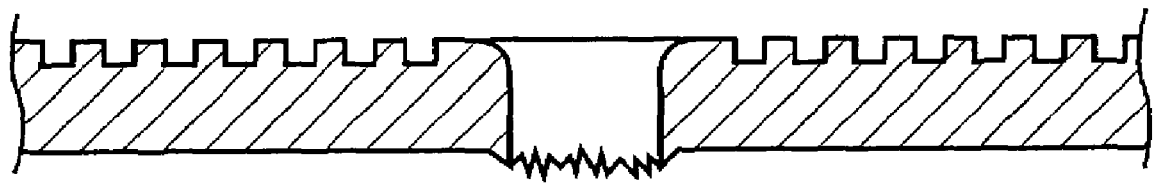
Figure 18C:
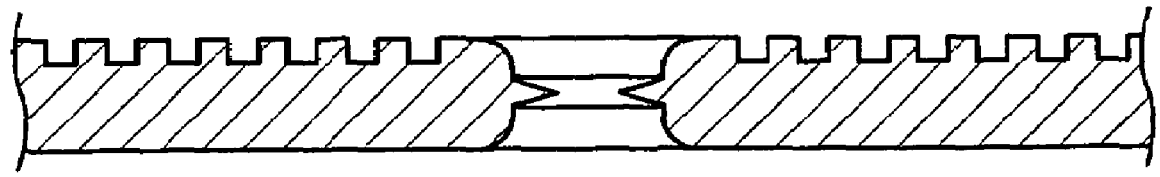

FIG. 15 shows a principal part of the injection mold 52 used in the injection molding machine according to Embodiment 9 of this invention. Embodiment 9, in contrast to Embodiment 8, is characterized by the cutter punch 12 consisting of one component provided at its inside end with the concave portion 12a, the periphery of which is of a circular plane. The following description is focused on the parts that are different from those of Embodiment 8 with explanation of the other parts being omitted.

The gas passage 7 communicates with the gap 74 between the cutter punch 12 and the ejector 13, through which the high pressure gas flows into the cavity 54.

The ejector 13 and the cutter punch 12 in its normal position, where the stationary mold 1 and the movable mold 2 are closed, are designed to retract with respect to the movable side fixing bush 14 (e.g., movable mirror surface plate 15) as shown with broken line in FIG. 15. Due to this configuration, the melted resin can flow into the cavity 54.

After the injection of the melted resin, the cutter punch 12 and the ejector 13 are advanced, with their relative positions being kept, in the direction of the white arrow into positions just in front of the sprue bush 3 as shown with the solid line in FIG. 15. And, while the resin is still melted, the high pressure gas flows out of the gap 74 between the cutter punch 12 and the ejector 13 to move the resin for completely separating the optical disk substrate 56 from the sprue portion 64. The resin is to be cooled to solidify along with the decline of the gas pressure. Thus, the end of the inner hole 56a is made round without a flash.

The clearance 66 between the cutter punch 12 and the sprue bush 3 is preferably not greater than 0.1 mm, and more preferably not less than 10 μm and not greater than 50 μm. In this case, a pocket caused by the gas at the end of the inner hole 56a is of a radius not greater than 0.1 mm.

In this case, the cutter punch 12 in its projected position and the ejector 13 are preferably designed to face to the substrate at almost the same height to make the optical disk substrate 56 flat in the vicinity of the inner hole 56a.

In Embodiment 9, the outer diameter of the cutter punch 12 is designed to be approximately the same as the outer diameter of the end of sprue bush 3, which corresponds to the diameter of the inner hole 56a. Alternatively, however, the cutter punch 12 may have a less outer diameter.

Throughout Embodiments 1 to 9, the cutter punch 12 in the movable mold 2 has been explained as to serve as the movable portion of the mold. Alternatively, however, a modification is possible that the sprue bush 3 in the stationary mold 1 serves as the movable portion of the mold.

The feature of Embodiment 9 is summarized in the followings.

(1) According to this embodiment, the gas passage communicates with the clearance by way of the gap between the movable portion and the ejector. Thus, the gas passage communicates with the cavity by way of the gap even if a gas passage itself is not formed to communicate with the cavity.

INDUSTRIAL APPLICABILITY

This invention is applicable to an injection molding machine, method and an injection mold for molding a plastic product formed with an inner hole, such as optical disk substrate.

The invention claimed is:

1. An injection molding machine for forming a plastic mold product having an inner through hole by injecting a melted resin into a cavity defined by a first mold and a second mold, comprising:
a movable portion provided in one of the first and second molds;
a sprue bush provided in the other of the first and second molds;
a portion, provided on at least one of the movable portion and the sprue bush, having a peripheral surface for forming an inner surface of the inner through hole in the plastic mold product;
a gas passage provided in at least one of the first and second molds so as to communicate with the cavity, the gas passage having an outlet at an end thereof;
a valve provided in a gas pipe communicating with the gas passage; and
a controller,
wherein the movable portion is adapted to be movable between a normal position for injection of the melted resin and a projected position projecting into the cavity so that a clearance remains between the movable portion, its counterpart mold, and the portion having the peripheral surface for forming the inner surface of the inner through hole, the clearance being in communication with a first space defined by the peripheral surface within the cavity for forming the plastic mold product in the cavity and a second space between the movable portion and the sprue bush for accommodating a sprue separated from the plastic mold product to form the inner through hole in the plastic mold product, the outlet of the gas passage being arranged so as to supply gas into the clearance at a position that is closer to a center of the through hole than the peripheral surface is to the center of the through hole, and
wherein the controller is operable to control a movement of the movable portion and an opening and closing of the valve in conjunction with the injection of the resin so as to open the valve and supply gas into the clearance before solidification of the melted resin in the first space and the second space when the movable portion is in the projected position.

2. The injection molding machine according to claim 1, wherein the controller is operable to open the valve for a period not less than 0.05 second and not greater than 1 second.

3. The injection molding machine according to claim 1, wherein a tank is provided for the gas pipe in a position upstream of the valve, an inside pressure of the tank being set greater than a pressure of the melted resin by 2% or more and 15% or less.

4. The injection molding machine according to claim 1, wherein a tank is provided for the gas pipe in a position upstream of the valve and an inside pressure of the tank before the opening of the valve is higher than a pressure of the melted resin by 2% or more and 10% or less, and
wherein a capacity of a gas flowing system including the tank up to the cavity is set not less than 5 cm$^3$ and not greater than 30 cm$^3$.

5. The injection molding machine according to claim 1, wherein the clearance is set not less than 10 μm and not greater than 50 μm.

6. The injection molding machine according to claim 1, wherein the clearance is defined at an end of the inner through hole with respect to a projecting direction of the moveable portion.

7. The injection molding machine according to claim 1, wherein the clearance is defined at a midway of the inner through hole with respect to a projecting direction of the moveable portion.

8. The injection molding machine according to claim 1, wherein the injection molding machine is so constructed that gas coming into the cavity directly flows into the clearance.

9. The injection molding machine according to claim 1, wherein the gas passage communicates with the clearance through a gap between the sprue bush and a stationary bush which holds the sprue bush.

10. The injection molding machine according to claim 1, wherein the movable portion includes an outer cylinder and an inside cylinder, and
wherein the gas passage communicates with the clearance through a gap between the outer cylinder and the inside cylinder.

11. The injection molding machine according to claim 1, wherein the gas passage communicates with the clearance through a gap between the movable portion and an ejector.

12. The injection molding machine according to claim 1, further comprising:
a tank arranged upstream of the valve of the gas pipe;
a pressure detector for detecting a pressure inside the tank; and
a pressurizer for increasing the pressure inside the tank,
wherein the controller is operable to activate the pressurizer in accordance with the pressure detected by the pressure detector.

13. An injection molding machine for forming a plastic mold product having an inner through hole by injecting a melted resin into a cavity defined by a first mold and a second mold, comprising:
a movable portion provided in one of the first and second molds;
a sprue bush provided in the other of the first and second molds;
a portion, provided on one of the movable portion and the sprue bush, having a peripheral surface for forming an inner surface of the inner through hole in the plastic mold product;
a gas passage provided in at least one of the first and second molds so as to communicate with the cavity, the gas passage having an outlet at an end thereof;

a valve provided in a gas pipe communicating with the gas passage; and a controller, wherein the movable portion is adapted to be movable between a normal position for injection of the melted resin and a projected position projecting into the cavity so that a clearance remains between the movable portion, its counterpart mold, and the portion having the peripheral surface for forming the inner surface of the inner through hole, the clearance being in communication with a first space defined by the peripheral surface within the cavity for forming the plastic mold product in the cavity and a second space between the movable portion and the sprue bush for accommodating a sprue separated from the plastic mold product to form the inner through hole in the plastic mold product, the gas passage being arranged so as to supply gas into the clearance at a position opposed to the peripheral surface with respect to the clearance, and wherein the controller is operable to control a movement of the movable portion and an opening and closing of the valve in conjunction with the injection of the resin so as to open the valve and supply gas into the clearance before solidification of the melted resin in the first space and the second space when the movable portion is in the projected position.

* * * * *